US008182879B2

(12) United States Patent
Sugaya et al.

(10) Patent No.: US 8,182,879 B2
(45) Date of Patent: *May 22, 2012

(54) METHOD FOR PREVENTING ELUTION OF NICKEL FROM WATER-CONTACT INSTRUMENT OF COPPER ALLOY BY FORMATION OF A PROTECTIVE FILM

(75) Inventors: Norikazu Sugaya, Yamanashi (JP); Teruhiko Horigome, Yamanashi (JP)

(73) Assignee: Kitz Corporation, Chiba (JP)

( * ) Notice: Subject to any disclaimer, the term of this patent is extended or adjusted under 35 U.S.C. 154(b) by 1061 days.

This patent is subject to a terminal disclaimer.

(21) Appl. No.: 10/590,503

(22) PCT Filed: Mar. 4, 2005

(86) PCT No.: PCT/JP2005/003741
§ 371 (c)(1),
(2), (4) Date: Aug. 24, 2006

(87) PCT Pub. No.: WO2005/085500
PCT Pub. Date: Sep. 15, 2005

(65) Prior Publication Data
US 2007/0166473 A1 Jul. 19, 2007

(30) Foreign Application Priority Data
Mar. 5, 2004 (JP) ................. 2004-063249

(51) Int. Cl.
*B05D 5/00* (2006.01)
*B05D 7/16* (2006.01)
*C23F 11/00* (2006.01)
*C23F 17/00* (2006.01)

(52) U.S. Cl. ..................................... 427/409
(58) Field of Classification Search ............... 427/156, 427/239, 402, 409
See application file for complete search history.

(56) References Cited

U.S. PATENT DOCUMENTS

| | | | |
|---|---|---|---|
| 4,406,811 A | 9/1983 | Christensen et al. | |
| 5,544,859 A | 8/1996 | Coltrinari et al. | |
| 5,601,658 A | 2/1997 | Marinas et al. | |
| 5,650,088 A | 7/1997 | Kodama | |
| 5,904,783 A | 5/1999 | Hager et al. | |
| 5,958,257 A | 9/1999 | Regelbrugge et al. | |
| 6,013,382 A | 1/2000 | Coltrinari et al. | |
| 6,197,210 B1 | 3/2001 | Myerson | |
| 6,200,482 B1 | 3/2001 | Winchester et al. | |
| 6,270,590 B1 | 8/2001 | Giusti | |
| 6,293,336 B1 | 9/2001 | Emerick et al. | |
| 6,383,643 B1 * | 5/2002 | De Jarlais | 428/418 |
| 6,434,967 B2 | 8/2002 | Emerick et al. | |
| 6,461,534 B2 | 10/2002 | Giusti | |
| 6,770,215 B2 | 8/2004 | Giusti | |
| 7,368,019 B2 * | 5/2008 | Sugaya | 134/3 |
| 2001/0045272 A1 | 11/2001 | Emerick et al. | |
| 2002/0043308 A1 | 4/2002 | Giusti | |
| 2002/0189721 A1 | 12/2002 | Giusti | |

FOREIGN PATENT DOCUMENTS

| | | | |
|---|---|---|---|
| CA | 1118990 | * | 3/1982 |
| EP | 0 683 245 | | 11/1995 |
| EP | 0 892 084 A1 | * | 1/1999 |
| EP | 1 038 990 | | 9/2000 |
| EP | 1 548 155 | | 6/2005 |
| JP | 04-261091 | | 9/1992 |
| JP | 5-125584 | | 5/1993 |
| JP | 11-29887 | | 2/1999 |
| JP | 11-510217 | | 9/1999 |
| JP | 2000-17447 | | 1/2000 |
| JP | 2001-152369 | | 6/2001 |
| JP | 2002-155391 | | 5/2002 |
| JP | 2002-180267 | | 6/2002 |
| JP | 2002-180267 A | * | 6/2002 |
| WO | 96/39549 | | 12/1996 |
| WO | WO 96/39549 A1 | * | 12/1996 |
| WO | 97/06313 | | 2/1997 |
| WO | 02/36856 | | 5/2002 |
| WO | 2004/022817 | | 3/2004 |
| WO | 2004/024987 | | 3/2004 |

OTHER PUBLICATIONS

International Preliminary Report on Patentability for PCT/JP2005/003741, Dec. 22, 2006, 5 pages.*
Supplementary European Search Report (in English language) issued Jan. 15, 2010 in corresponding European Patent Application No. 05 72 0013.

* cited by examiner

*Primary Examiner* — William Phillip Fletcher, III
(74) *Attorney, Agent, or Firm* — Wenderoth, Lind & Ponack, L.L.P.

(57) ABSTRACT

There are provide a nickel elution prevention method for preventing a water-contact instrument made of copper alloy from eluting nickel even when being water-contact with a fluid, such as city water, a protective film formation agent for preventing the elution of nickel and a detergent for preventing the elution of nickel. The water-contact instrument includes valves for city water, feedwater or hot water, pipe joints, strainers, water faucet clasps, pump supplies materials, water meters, water purifiers, water feeders, hot water feeders or other such water-contact instruments each made of copper alloy, such as bronze, brass, etc., plated with a material containing nickel, for example. The nickel elution prevention method for the water-contact instrument of copper alloy includes applying the protective film formation agent containing at least one species of benzotriazole, benzotriazole derivatives and organic acids including a straight-chain fatty acid to at least a water-contact surface of the water-contact instrument of copper alloy to form a protective film, thereby suppressing elution of nickel via the protective film.

7 Claims, 26 Drawing Sheets

FIG. 16
(a)
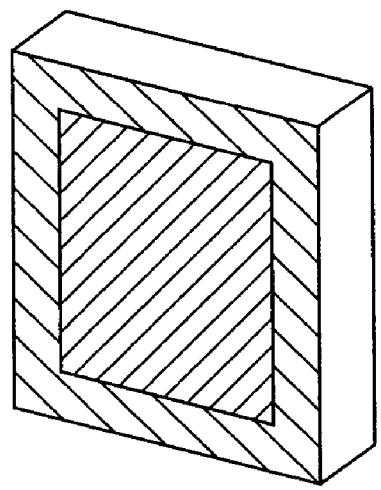
(b)
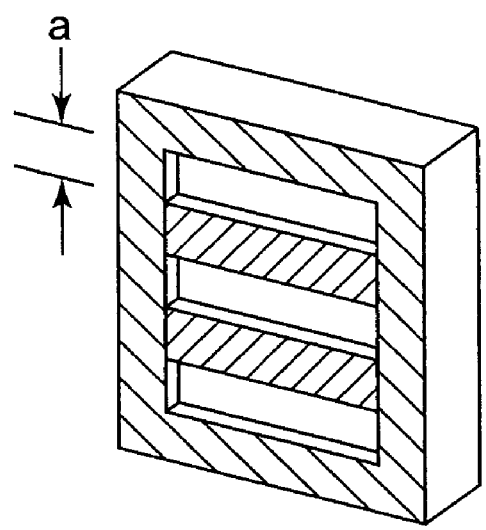

FIG. 2 6
(a)
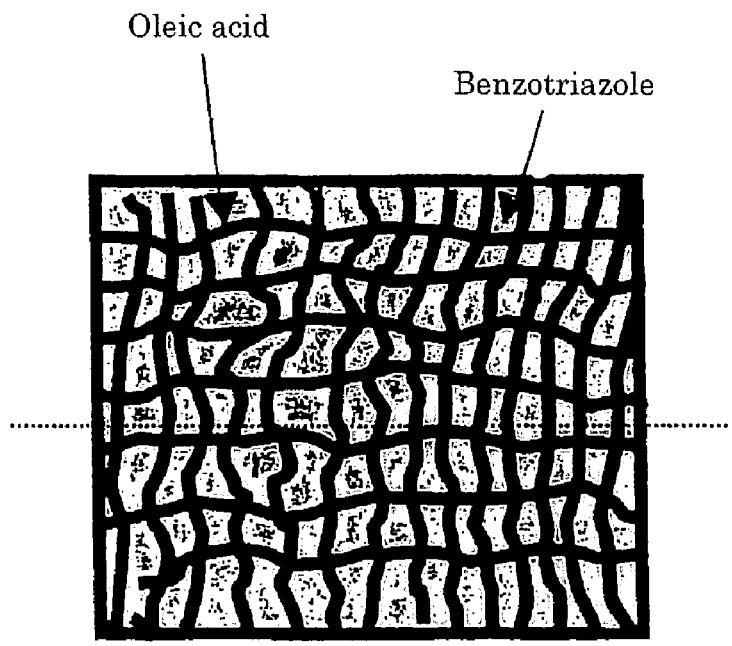
(b)
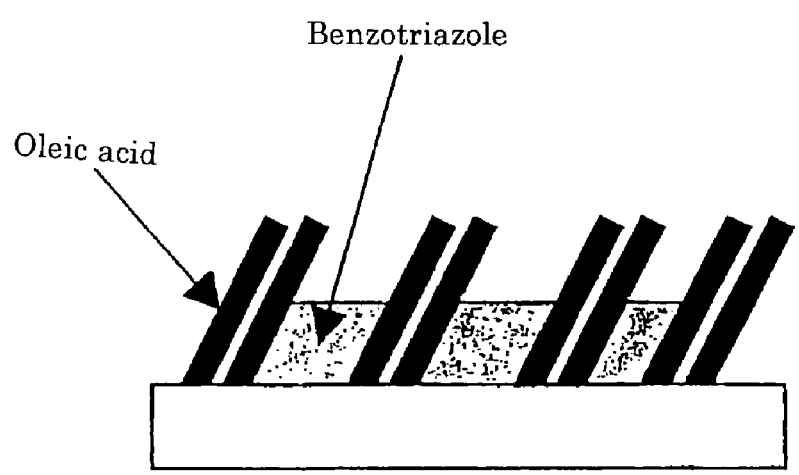

METHOD FOR PREVENTING ELUTION OF NICKEL FROM WATER-CONTACT INSTRUMENT OF COPPER ALLOY BY FORMATION OF A PROTECTIVE FILM

TECHNICAL FIELD

The present invention relates to a method for preventing elution of nickel from a water-contact instrument of copper alloy, a protective film formation agent for preventing the elution of nickel and a detergent for preventing the elution of nickel.

BACKGROUND OF THE INVENTION

Generally, valves for city water, feedwater or hot water, pipe joints, strainers, water faucet clasps, pump supplies materials, water meters, water purifiers, water feeders, hot water feeders or other such water-contact instruments are provided at halfway or end sections of pipes for city water, feedwater or hot water. These water-contact instruments are almost made of copper alloy, such as bronze or brass excellent in castability, mechanical machinability and economical efficiency. Particularly, in valves, joints, etc. made of bronze or brass, alloy added with a prescribed amount of lead is used for bronze ones in order to enhance the characteristics thereof including castability and mechanical machinability and for brass ones in order to enhance the characteristics thereof including cutting machinability and a hot-forging property. When the instruments made of bronze or brass containing lead are exposed to a fluid, such as city water, however, a lead component of the lead-containing metal deposited on the water-contact surface layer is possibly eluted into the city water.

In view of the above, the water quality standards of city water as a beverage have been prescribed by the rating identification method carried out in accordance with the specific procedure. City water has to meet the water quality standards. Since lead is a substance harmful to human bodies and the amount of lead leached has to be reduced as much as possible, restrictions on the lead leaching standard came to strengthening in April, 2003 in Japan. Under these circumstances, water-contact instruments of copper alloy produced using a so-called leadless material having lead removed from a fodder and water-contact instruments of copper alloy having the elution of lead reduced through surface treatments for a conventional lead-containing material including an acid or alkali cleaning treatment go into circulation. For example, lead elution reduction techniques are described in the following (refer, for example, to Patent Documents 1 to 3).

The lead elution prevention method described in Japanese Patent No. 3345569 (Patent Document 1) was developed by the present applicants and comprises the step of cleaning at least the water-contact surface of a piping instrument of copper alloy containing lead with a detergent comprising a nitric acid added with a hydrochloric acid as an inhibitor to form a coat the water-contact surface with the hydrochloric acid, thereby deleading the surface layer of the water-contact surface. In particular, by using benzotriazole (BTA) in place of the hydrochloric acid as an inhibitor, tarnish and corrosion are suppressed.

JP-A 2002-180267 (Patent Document 2) discloses, as a lead elution prevention technique, a lead elution prevention treatment method comprising immersing a clasp for feedwater and wastewater in a solution of any of benzotriazole-based compounds to form a film attached firmly to the surface of the clasp.

JP-A 2001-152369 (Patent Document 3) discloses, as a lead removing technique, a lead elution prevention treatment method comprising immersing a clasp for feedwater and wastewater in an etching treatment solution containing an organic carboxylic acid or a salt thereof.

In addition to the improvement in the prevention of lead elution as described above, an improvement in elution prevention of nickel adversely affecting human bodies has now been calling for urgent attention. Valves, pipe joints, water faucet clasps and other such water-contact instruments are subjected to various kinds of plating treatments, commencing with nickel-plating treatment, for the purpose of enhancing the exterior beauty, corrosion resistance and abrasion resistance. Examples of plating treatments include nickel-plating, nickel-alloy-plating, nickel-chromium-plating and nickel-tin-plating treatments. When these nickel-based plating treatments have been adopted, the coat wraps around and adheres to the spout section of a water-contact instrument.

FIG. 1 is a cross section showing a JIS wall faucet (made of CAC 406) plated with nickel-chromium alloy, and FIG. 2 is a partially enlarged cross section showing a spout section shown in FIG. 1. As shown in FIG. 2, the spout section of a water-contact instrument 1 coated with a coat 2 has a nickel coat 2b not constituting a composite layer with a chromium coat 2a. This is why the nickel coat 2b rather than the chromium coat 2a wraps around the inward portion of the spout section due to the difference in current density range between the two. In this state, when a fluid, such as city water, is supplied to the water-contact instrument 1, there is a possibility of nickel of the nickel coat 2b being eluted into the fluid.

FIG. 3 is an enlarged view showing a section "B" in FIG. 2 and, as shown, when copper (water-contact portion 1a) that is a metal having a high corrosion potential and nickel (nickel coat 2b) that is a metal having a low corrosion potential in contact with each other are water-contact with a fluid exhibiting good electrical conductivity, such as city water, to form an electrically conductive state, the nickel (nickel coat 2b) having a low corrosion potential is anode-polarized by the copper (water-contact portion 1a) having a high corrosion potential to give rise to a corrosion reaction and generate bimetallic corrosion that promotes oxidization and dissolution of nickel. Furthermore, the nickel coat 2b has a plurality of pinholes 2c and, of the pinholes, there exist those reaching the copper surface constituting the under layer of the nickel coat 2b. In consequence of a fluid exhibiting good electric conductivity, such as city water, having entered the pinholes, bimetallic corrosion is also generated there. Moreover, nickel is also eluted from the nickel coat 2b per se. The nickel elution reduction technique is disclosed in the following (refer, for example, to Patent Document 4 or 5).

The nickel elution reduction treatment method described in JP-A 2002-155391 (Patent Document 4), for example, comprises the steps of plating a water feeder made of copper or copper alloy with nickel, plating the nickel coat surface with chromium and removing the nickel coat running out the chromium coat. In the nickel-removing step, the water feeder is immersed in an oxidizing chemical, such as a sulfuric acid, for removing the nickel coat alone by dissolution. Thus, the nickel coat that has wrapped around the spout at the nickel-plating treatment can be removed by dissolution.

Japanese Patent No. 2836987 (Patent Document 5) discloses a technique for preventing the elution of nickel comprising the step of forming a thin film of aliphatic unsaturated carboxylic acid on a nickel coat plated on a ceramic substrate on which electronic parts are mounted.

Patent Document 1: Japanese Patent No. 3345569
Patent Document 2: JP-A 2002-180267

Patent Document 3: JP-A 2001-152369
Patent Document 4: JP-A 2002-155391
Patent Document 5: Japanese Patent No. 2836987

DISCLOSURE OF THE INVENTION

Problems the Invention Intends to Solve

However, the lead leaching tests described in JP-A 2002-180267 (Patent Document 2) and JP-A 2001-15239 (Patent Document 3) with the aim of reducing lead leaching is not in accordance with JIS S3200-7 (1997) "City Water Instrument—Leaching Performance Test Method" and, in addition thereto, the amount of leach liquor into which lead has leached out in an actual measurement is unclear. Thus, the technical effect thereof cannot be confirmed.

In JP-A 2002-155391 (Patent Document 4) with the aim of reducing nickel elution, the nickel coat running out the chromium coat cannot effectively be removed and, since the nickel coat always remains at the water-contact section, the nickel component is eluted from this section electrically conductive via a fluid, such as city water, to generate bimetallic corrosion and from the nickel coat per se. Thus, the nickel elution standards cannot satisfactorily be fulfilled at all. In addition, exfoliation of the nickel coat allows copper that is the bare metal to be exposed, and there is a possibility of lead segregated on the surface layer being eluted. Though the nickel elution test described in the prior art is in accordance with JIS S3200-7 (1997) "City Water Instrument—Leaching Performance Test Method," the amount of leach liquor into which nickel has leached out in an actual measurement is unclear. Thus, the technical effect thereof cannot be judged.

In view of the above, a test was conducted under the same conditions as in JP-A 2002-155391 (Patent Document 4) to confirm the technical effect of nickel removal. Though described later in detail in Example 1, the measurement results are shown in Table 6 showing sample No. 9 (using two test pieces each having an area of 2500 mm$^2$. An offset was obtained based on the actual measurement. Though described later, the offset is a numerical value to be compared with the elution standards. As shown in the same table, the amount of lead eluted was 0.0147 mg/l and that of nickel eluted was 0.1237 mg/l. Thus, it was confirmed that the two amounts were too large to satisfy the elution standards, respectively. According to water mixing valves known to have a large amount of nickel elution, therefore, in a sample, the portion of the nickel coat exposed only at the portion that wraps around the spout has an area of 3000 mm$^2$. A merely acid-cleaned actual product that has a water-contact portion having substantially the same area as the test piece has no longer satisfied the strict nickel elution standards.

The present inventors have further elucidated the causes of lead elution and nickel elution in this kind of field. FIG. 4 is a photograph by an EPMA (Electron Probe MicroAnalyzer) showing the nickel distribution on the inner surface of a JIS wall faucet (made of CAC 406) plated with nickel-chromium alloy and having a nominal diameter of 25 A and an inner volume of 40 ml. FIG. 5 is a photograph showing the lead distribution. Incidentally, reference numeral 3 in FIG. 1 denotes a portion analyzed with an EPMA (Electron Probe MicroAnalyzer). The measurement by the EPMA (Electron Probe MicroAnalyzer) was conducted with an acceleration voltage of 30 KV and a probe current of 10 nA. As shown in FIGS. 4 and 5, in the inner surface (CAC 406 surface) 1a of the sample 1 subjected to nickel-chromium plating, it is confirmed that lead and nickel partially exist at substantially the same position of the measured surface. As is clear from the electron micrograph of FIG. 6, the positions at which the two elements exist are in accord with the positions of the crystal grain boundary of a metal surface.

FIG. 7 is an explanatory view showing the state of existence of lead and nickel at the grain boundary of the inner surface of an instrument, such as a water feeder, the outer surface of which is plated with nickel. Valves, pipe joints, strainers, water faucet clasps or other water feeders having complicated flow paths are formed of a copper alloy material by sand casting. The casting surface thus cast is bumpy and, at the dent portions thereof, lead 5 moved from a crystal grain boundary 4 to the surface layer at the time of the solidification is segregated. Particularly at the inside surface layer of a water feeder not subjected to surface treatment, the segregation is conspicuous. When plating treatment is performed in this state, the plating solution stays on the lead 5 at the dent portion and dries there and consequently it is conceivable that a nickel salt 6 different from metallic nickel adheres to the lead 5. Since a water feeder, such as a water faucet clasp, has complicated flow paths and since the plating solution staying inside is difficult to eliminate, it is conceivable that adherence of the nickel salt 6 becomes conspicuous. When a fluid, such as city water, is supplied to the water feeder in this state, the lead 5 and nickel salt 6 are eluted.

In the Patent Documents mentioned above and other prior art, this point is not taken into consideration. Even when adopting the technique of JP-A 2002-180267 (Patent Document 2) to form a film of benzotriazole 33 on lead 31 segregated on a crystal grain boundary 30 as shown in FIG. 23, it is insufficient to prevent elution of the lead. Also as shown in the same figure, since the film of benzotriazole 33 is not formed on a nickel salt 32 that is not a metal, elution of the nickel salt 32 consequently proceeds and subsequently a large amount of segregated lead 31 under it is eluted. Thus, it is impossible to prevent elution of both nickel and lead.

Here, the following test was conducted to confirm the effect of reducing leaching of lead by benzotriazole. Two test pieces of pure lead (5 mm×5 mm×1 mm) were prepared as samples. One of the test pieces was degreased, then immersed in a 1-wt % benzotriazole solution for five minutes and dried. The other test piece was untreated. The two test pieces were tested for leaching of lead based on JIS S3200-7 (no conditioning and 16-hour immersion). The test results are as shown in Table 1 below.

TABLE 1

| Sample | Amount of lead leached (Actual measurement mg/l) |
|---|---|
| Untreated sample | 0.012 |
| Sample treated with benzotriazole | 0.011 |

The effect of reducing leaching of lead could not be confirmed from the test results. This implies that the mere immersion treatment with the solution containing benzotriazole fails to form a film of benzotriazole on the lead and, therefore, it is said that leaching of lead cannot be suppressed.

Further here, it was verified whether or not a film was formed on a nickel salt. A test method was performed when pure water was introduced into a beaker in which a nickel salt in a given amount corresponding to supersaturation was contained and when treated liquid containing 0.5-wt % of benzotriazole+a stearic acid+a small amount of oleic acid was introduced into a beaker. Clear supernatant liquids were obtained and measured in terms of the amount of nickel existing therein in a dissolved state. The clear supernatant liquids were diluted at the same rate and analyzed. Incidentally, 10 g of nickel sulfate and 10 g of nickel chloride were prepared as nickel salts. A test was conducted when 10 cc of pure water was introduced into each of the nickel sulfate and nickel chloride, and 10 cc of treated liquid was introduced into each of the nickel sulfate and nickel chloride. The test results are shown in Table 2 below.

TABLE 2

| Nickel salt | Amount of nickel leached (mg/l) | |
| --- | --- | --- |
| | Pure water | Treated liquid |
| Nickel sulfate | 21.4 | 25.2 |
| Nickel chloride | 25.7 | 27.0 |

If a film should be formed on a nickel salt, the effect of reducing leaching of nickel ought to be manifested. However, such an effect could not be confirmed from the test results. It is conceivable that the nickel salt is difficult to bond to benzotriazole because it has no free electron.

Therefore, a mere combination of the technique that cannot prevent the elution of a nickel salt having adhered to the inside residual (Patent Document 2, for example) with the technique that cannot satisfy the nickel-leaching standards (Patent Document 4, for example) cannot attain a technique of reducing nickel leaching satisfying the current nickel-leaching standards. In view of the states where lead or a nickel salt adheres to the inside residual and where a nickel coat adhering to the spout section of a water-contact instrument is exposed, a simple combination of the surface treatment technique with the film treatment technique cannot solve the problem under discussion at all. Insofar as organic combinations, such as individual degrees of treatments and order of the treatments, a technique of reducing the elution of nickel and further lead cannot be materialized.

The technique disclosed in Japanese Patent No. 2836987 (Patent Document 5) is a technique plating a nonmetal, such as ceramic, that is a so-called electroless plating different from the technical means of plating a bare metal with a metal. Therefore, the prior art technique cannot be applied without any modification.

In consideration of the state of affairs described above, the present inventors have made keen studies to develop the present invention. The object thereof is to provide a nickel elution prevention method for preventing a water-contact instrument made of copper alloy from eluting nickel even when being water-contact with a fluid, such as city water, provide a protective film formation agent for preventing the elution of nickel and provide a detergent for preventing the elution of nickel, the water-contact instrument including valves for city water, feedwater or hot water, pipe joints, strainers, water faucet clasps, pump supplies materials, water meters, water purifiers, water feeders, hot water feeders or other such in water-contact instruments each made of copper alloy, such as bronze, brass, etc., plated with a material containing nickel, for example.

Means for Solving the Problems

To attain the above object, the invention of claim 1 is directed to a method for preventing elution of nickel from a water-contact instrument made of copper alloy and plated with a material containing nickel, comprising applying a protective film formation agent to a surface of a nickel coat that wraps around and adheres to at least a water-contact surface of the water-contact instrument to form a protective film, thereby suppressing the elution of the nickel.

The invention of claim 2 relates to the method for preventing elution of nickel from a water-contact instrument made of copper alloy, wherein the protective film formation agent contains at least one species selected from the group consisting of benzotriazole, benzotriazole derivatives and organic acids including straight-chain fatty acids.

The invention of claim 3 relates to the method for preventing elution of nickel from a water-contact instrument made of copper alloy, wherein the protective film comprises two layers of or an appropriate composite layer of benzotriazole and organic acids including a straight-chain fatty acid that constitute the protective film formation agent.

The invention of claim 4 relates to the method for preventing elution of nickel from a water-contact instrument made of copper alloy, further comprising forming a second protective film on a surface of a nickel coat at a water-contact section of the water-contact instrument using the protective film formation agent, thereby suppressing the elution of the nickel due to bimetallic corrosion via the second protective film.

The invention of claim 5 relates to the method for preventing elution of nickel from a water-contact instrument made of copper alloy, wherein the nickel coat has pinholes and the second protective film is formed in the pinholes using the protective film formation agent so that the copper alloy and nickel are insulated.

The invention of claim 6 relates to the method for preventing elution of nickel from a water-contact instrument made of copper alloy, wherein the protective film formation agent is used to form the protective film on a surface of a nickel coat on a water-contact section of the water-contact instrument, thereby suppressing via the protective film dissolution of the nickel per se by wetting.

The invention of claim 7 relates to the method for preventing elution of nickel from a water-contact instrument made of copper alloy, wherein the protective film formation agent is applied to at least the in water-contact surface of the water-contact instrument to form a protective film, and further comprising removing by rinsing a nickel salt adhering as a residual to an inside of the water-contact instrument.

The invention of claim 8 relates to the method for preventing elution of nickel from a water-contact instrument made of copper alloy, further comprising deleading a surface layer of the water-contact section of the water-contact instrument.

The invention of claim 9 relates to the method for preventing elution of nickel from a water-contact instrument made of copper alloy, wherein one or both of the nickel salt adhering as a residual to the inside of the water-contact instrument and lead segregated on the surface layer of the water-contact section are rinsed with a cleaning fluid containing a nitric acid and having a hydrochloric acid added thereto as an inhibitor.

The invention of claim 10 is directed to a protective film formation agent for forming a protective film to prevent elution of nickel from a water-contact instrument made of copper alloy, comprising at least one species selected from the group consisting of benzotriazole, benzotriazole derivatives and organic acids including a straight-chain fatty acid.

The invention of claim 11 is directed to a detergent for preventing elution of nickel from the water-contact instrument made of copper alloy, that enables the nickel salt adhering as a residual to the inside of the water-contact instrument to be removed and metallic nickel on a spout section of the water-contact instrument to be suppressed from being eluted.

The protective film formation component is dissolved in an organic solvent containing at least one species selected from the group consisting of glycolethers, alcohols and amines to be adapted for the DiMethyGlyoximel (DMG) test based on the EN12471 standards. As the glycolethers, 3-methyl-3-methoxybutanol and butyl cellosolve can be raised. As the alcohols, benzylalcohol can be cited. As the amines, morphorine, monoethanolamine, triethanolamine, alcanolamines having an isoform like triisopropanylamine, amines having a cycloform like cyclohexylamine and dicyclohexylamine and long-chain alcoholamine can be listed.

As the organic solvent, a solvent containing 10 wt % of 3-methyl-3-methoxybutanol and 0.03 wt % or more of morphorine, a solvent containing 10 wt % of 3-methyl-3-methoxybutanol and 0.02 wt % or more of monoethanolamine or a solvent containing 10 wt % of 3-methyl-3-methoxybutanol and 0.05 wt % or more of triethanolamine is preferred.

Effects of the Invention

According to the invention of claim 1, it is made possible to provide an environmentally conscious water-contact instrument of copper alloy stably used without eluting nickel from it into a fluid, such as city water, supplied even in a state wherein the water-contact instrument is plated with nickel to allow the nickel to adhere to a water-contact surface, such as a spout, thereof. The water-contact instrument of copper alloy includes water supply instruments installed midway in feed-water pipes or other plumbing, such as valves for city water, feedwater or hot water, pipe joints, strainers, etc. and water supply instruments installed at the end in feed-water pipes, such as water faucets, water purifiers, water feeders, hot water feeders, etc.

According to the invention of claim 2, it is made possible to form a protective film firmly adhering closely to the surface of a nickel coat using a protective film formation agent containing at least one species selected from the group consisting of benzotriazole, benzotriazole derivatives and organic acids, such as a straight-chain fatty acid. Thus, it is made possible to provide a method for preventing elution of nickel from a water-contact instrument of copper alloy even when being water-contact with a fluid, such as city water.

According to the invention of claim 3, the protective film can comprise two layers of or an appropriate composite layer of benzotriazole and organic acids including a straight-chain fatty acid that constitute the protective film formation agent. Thus, a further impregnable protective film can be materialized to enable the elution of nickel from a member over the protective film to be prevented infallibly.

According to the invention of claim 4, a protective film is formed on a water-contact portion and on the surface of a nickel coat at the water-contact portion to prevent electric conduction between the water-contact portion (water-contact section) and the nickel coat, thereby preventing the elution of the nickel due to bimetallic corrosion without fail.

According to the invention of claim 5, since the defective portions, such as pinholes, of the nickel coat are filled with the protective film formation agent, the elution of nickel due to bimetallic corrosion can infallibly be prevented.

According to the invention of claim 6, the formation of the protective film suppresses dissolution of nickel by wetting the nickel coat per se with a fluid, thus securely preventing the elution of nickel without being affected by a water quality factor, such as pH, and physical and chemical parameters, such as changes in fluid flow and in fluid temperature.

According to the inventions of claims 7 to 9, in a water-contact instrument of copper alloy, such as bronze, brass, etc. plated with nickel, lead segregated on the surface layer of the water-contact section thereof and nickel salt adhering as a residual to the inside thereof can securely be removed to prevent the elution of the nickel having adhered to the water-contact section, such as a spout, thereof. These metals are not eluted even when a fluid, such as city water, has been supplied to the water-contact instrument. According to the ministry ordinance of Ministry of Health, Labor and Welfare on the water quality standards, the lead leaching standard value for feedwater instruments (valves etc.) installed midway in a piping is 0.01 mg/l and that for feedwater instruments (water faucets etc.) installed in a piping end is 0.007 mg/l as an exception value. According to the water quality management of Ministry of Health, Labor and Welfare, the target setting item value as regards nickel is 0.01 mg/l. Therefore, the nickel leaching standard value for feedwater instruments (valves etc.) installed midway in a piping is 0.01 mg/l and that for feedwater instruments (water faucets etc.) installed in a piping end is 0.001 mg/l. It is made possible to provide a method for preventing the elution of nickel from a water-contact instrument of copper alloy, which satisfies these standards. Particularly, an acid cleaning treatment with a cleaning fluid containing a nitric acid and having a hydrochloric acid added thereto as an inhibitor functions to manifest an activation effect and as a pretreatment of the formation of a protective film. Thus, organic combination of the acid cleaning treatment and the protective film formation treatment can be materialized.

According to the invention of claim 10, it is made possible to form a protective film firmly adhering closely to the water-contact portion of a water-contact instrument of copper alloy plated with nickel and to the surface of a nickel coat at the water-contact section and also possible to fill the defective portions, such as pinholes, of the nickel coat. Therefore, it is possible to provide a protective film formation agent for forming a protective film capable of preventing elution of nickel due to bimetallic corrosion not to mention by wetting the nickel coat per se with a fluid.

According to the invention of claim 11, it is made possible to provide a detergent for preventing elution of nickel from the water-contact instrument, which detergent enables the nickel salt adhering as a residual to the inside of the water-contact instrument to be removed and metallic nickel on a spout section of the water-contact instrument to be suppressed from being eluted.

Furthermore, according to the present invention, by applying the protective film formation agent dissolved in an organic solvent to playthings, literary tools, accessories, food processors, medical devices, medical products, etc. made of copper alloy, stainless steel, nickel alloy, steel, etc. and plated with nickel etc., it is possible to provide an excellent effect of preventing an onset of a nickel allergy resulting from contact with these products and parts.

BRIEF DESCRIPTION OF THE DRAWINGS

FIG. 16(a) shows a sample having formed a square region to be in water-contact through masking of four sides of each of the front and rear surfaces thereof, and FIG. 16(b) is a perspective view showing a sample having plating removed over a width "a" to expose bare metal material sections that are to be in water-contact.

FIG. 26(a) is an explanatory plan view showing the structure of a protective film, and FIG. 26(b) is an explanatory cross section showing the structure of the protective film.

EXPLANATION OF REFERENCE NUMERALS

| | |
|---|---|
| 1 | Water-contact instrument made of copper alloy |
| 1a | Water-contact section (water-contact portion, water-contact surface) |
| 2 | Plating |
| 2a | Chrome plating |
| 2b | Nickel plating |
| 2c | Pinhole |
| 5 | Lead |
| 6 | Nickel salt |
| 13 | Deleading step |
| 15 | Plating step |
| 16 | Nickel-removing step |
| 18 | Protective film formation step |
| 20 | Protective film |
| 20a | Protective film (benzotriazole) |
| 20b | Protective film (organic acid) |

BEST MODE FOR CARRYING OUT THE INVENTION

A nickel elution prevention method according to the present invention applied to a water-contact instrument made of bronze or brass will be described as an embodiment with reference to the drawings. The water-contact instrument used herein includes feedwater instruments and their parts installed midway in a feedwater pipe or plumbing, such as valves for city water, feedwater or hot water, pipe joints, strainers, etc.; feedwater instruments and their parts installed at the exit of a feedwater pipe, such as water faucets, water purifiers, water feeders, hot water feeders, etc.; and other completed products connected directly to a feedwater pipe or plumbing.

In making a nickel elution prevention treatment in the present invention, water-contact instruments made of copper alloy cast and then processed (valve parts in this example) are preferably disposed in an exclusive net container resistant to heat and chemicals so as not to collide against each other to induce traces and flaws of collision. N workpieces in number that are water-contact parts, such as bodies, bonnets, etc. are disposed as a one unit in an exclusive container. The one unit is subjected to treatments described below as a unit to enable the variation of treatment in the parts to be decreased and the quality of the parts to be made constant. Incidentally, parts constituting a valve may be disposed in a lump in an exclusive container and then treated.

The workpieces are disposed so as not to form air pockets in which air bubbles are collected, but to remove the air bubbles to the upper side and sideways. Since the water-contact instrument has a complicated shape, during the immersion in each treatment vessel, stimuli by shaking and ultrasonic waves are given to completely remove the air bubbles still remaining. It is thus preferred that the whole water-contact surface of the water-contact instrument come into contact with a cleaning fluid. In the present example, all the steps described later are taken, with the water-contact instrument contained in the exclusive container. After the treatment, the water-contact instrument is removed from the exclusive container and brought to an assembling step. An acid cleaning treatment described later may be performed in a state of a completed product (a valve in this example) constituted by a plurality of parts cast and then processed.

Figure 8:
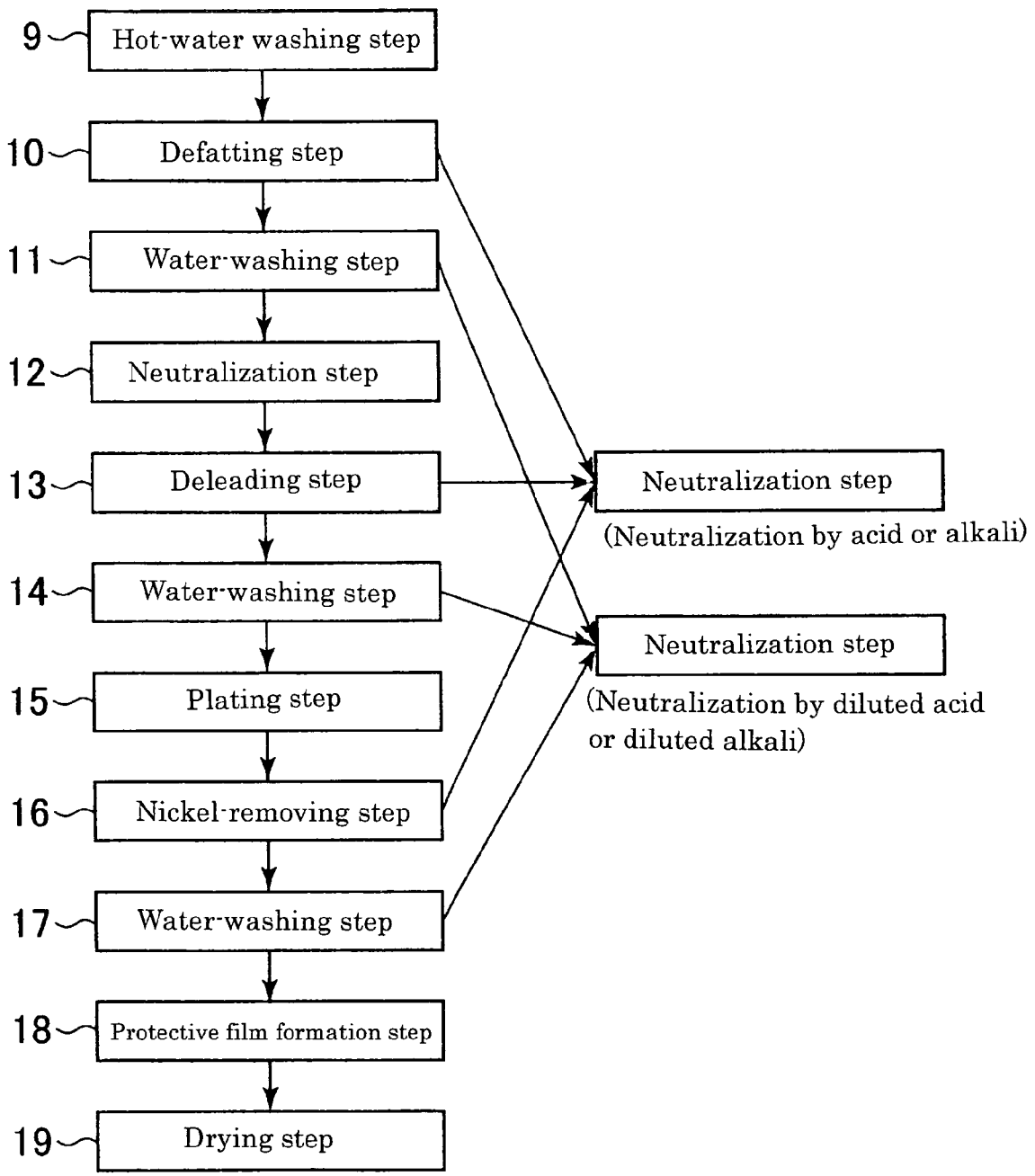
FIG. 8 is a flowchart showing one example of the processing steps in a method for preventing the elution of nickel according to the present invention.

Each of the steps of the nickel elution prevention method according to the present invention will next be described. FIG. 8 is a flowchart showing one example of the processing steps in a method for preventing the elution of nickel according to the present invention. A degreasing step 10 is for removing cutting oils and rustproof oils during the processing. The degreasing step is important because insufficient degreasing makes it difficult to completely remove lead during an acid cleaning treatment described layer. Incidentally, when the object to be treated (valve parts in this example) is heavily dirty, it is effective to provide a hot-water washing step 9 prior to the degreasing step 10 to remove extraneous matter. Examples of the degreasing step 10 are shown in Table 3 below. Of these, adoption of an alkali chelate detergent is preferred to prevent an adverse affect of a chlorine-based organic solvent on the environment and an increase in BOD by an emulsion detergent.

TABLE 3

| Detergent | Temperature | Time | Cleaning conditions |
| --- | --- | --- | --- |
| Chlorine-based organic solvent | Room temperature | 5 min | Immersion and ultrasonic cleaning |
| Neutral emulsion detergent | Room temperature | 10 min | Immersion and ultrasonic cleaning |
| Alkali emulsion detergent | Room temperature | 10 min | Immersion and ultrasonic cleaning |
| Alkali chelate detergent | 50° C. | 10 min | Immersion and shaking |
| Jet steam cleaning | — | 5 min | — |

When the alkali detergent has been used in the degreasing step 10, the detergent is fully washed away in a water-washing step 11 subsequent to the degreasing step 10. A plurality of water-washing vessels are provided and, for example, an end water-washing vessel may contain a mixed acid of 7 wt % of an nitric acid and 7 wt % of hydrochloric acid to completely remove by neutralization the alkali detergent component brought into the end vessel by a container. In a neutralization step 12, by managing the pH (hydrogen-ion exponent) in a main vessel provided for neutralization, a minute amount of the alkali component remaining in the water-washing step 11 can be removed reliably. When a deleading step 13 using a cleaning fluid comprising a mixed acid is to be taken after the neutralization step 12, as in this example, deterioration of the acid by neutralization is prevented to effectively promote deleading reliably.

The deleading step 13 will be described. The deleading step 13 adopts the same cleaning fluid as in a nickel-removing step 16 described later, and the water-contact instrument is immersed in the cleaning fluid comprising a nitric acid (at a concentration of 0.5 wt % to 0.7 wt %) and a hydrochloric acid (at a concentration of 0.05 wt % to 0.7 wt %) in a treatment vessel to effectively remove the lead deposited on the surface layer of the water-contact portion. In the case of a material having a large content of lead, such as CAC 406, since the present step 13 is provided prior to a plating step 15, it is effective because the lead segregated on the copper surface layer in the region on which plating is intended to perform can be removed in advance. While the cleaning fluid used in the deleading step 13 of the present example comprises a mixed acid having a nitric acid added with a hydrochloric acid as an inhibitor, it is used in the form of admixing in city water or pure water an acid, such as a nitric acid, or a mixed acid of a nitric acid added with a hydrochloric acid having an effect of an inhibitor. In this case, since the hydrochloric acid ions $Cl^-$ corrode the lead while forming a uniform film on the copper surface, the lead is corroded, with the surface retained lustrous. At this time, though lead hydrochloride and lead nitrate are formed on the lead portion, since these salts are soluble in the mixed acid, the corrosion goes on.

The acids contained in the cleaning fluid will be described. It is generally known that acids corrode (oxidize) lead. Since lead is easy to form an oxide film as a result of reaction thereof with an acid, the corrosion thereof is difficult to go on. However, lower organic acids, such as a nitric acid, a hydrochloric acid and an acetic acid, continuously corrode lead. Of these, the nitric acid ($HNO_3$) exhibits the highest lead corrosion rate. On the other hand, since the hydrochloric acid (HCl) exhibiting a low lead corrosion rate as compared with the nitric acid exhibits a high intensity of chemical combination with copper, when acid cleaning is performed using a mixed acid with a nitric acid, a copper chloride (CuCl) coat is formed on the surface of a water-contact instrument, prior to the formation of a copper oxide ($Cu_2O$ or $CuO$) coat by a chemical reaction of the nitric acid with copper, to suppress corrosion of the copper by the nitric acid. Thus, the hydrochloric acid functions as a so-called inhibitor. The inclusion of the hydrochloric acid eliminates oxidation of copper on the surface of a water-contact instrument and prevents a disadvantage in discoloring the surface into black to maintain metallic luster.

In addition, ultrasonic cleaning or shaking may be performed in a treatment vessel to promote lead corrosion. The stimulatory effect of lead elution by ultrasonic cleaning or shaking of a water-contact instrument will be described. The ultrasonic cleaning is to apply ultrasonic waves to the water-contact instrument in a cleaning fluid and has an effect of rapidly remove from the water-contact instrument various lead compounds produced by the reaction in the cleaning fluid. The shaking is to shake the water-contact instrument per se in the cleaning fluid and has an effect of removing lead compounds from the water-contact instrument and eliminating air pockets. Particularly, making stir of the cleaning fluid vigorous forms lead compounds to allow lead to be ready to elute. It is better to use the ultrasonic cleaning and the shaking together.

Though the deleading step adopts the same cleaning fluid as in the nickel-removing step, as described above, this is not limitative. A cleaning treatment with an acid other than the mixed acid as described above or an alkali cleaning treatment will suffice. Also, after the plating step and deleading step are taken, nickel may be removed in the nickel-removing step 16 to be described later. In the case of a material having a small lead content, it goes without saying that both lead and nickel can be removed in the nickel-removing step described later, with the deleading step 13 omitted.

Though the plating step 15 in this example adopts well-known and well-understood electrolytic nickel-chromium plating, this is not limitative. Nickel plating, nickel alloy plating, nickel-tin plating, etc. can optionally be adopted according to the implementation thereof. The plating contemplated by the present invention is not special plating, such as supercritical plating, but plating to which commercially available feedwater instruments, such as water faucets, valves, etc., are subjected.

Figure 1:
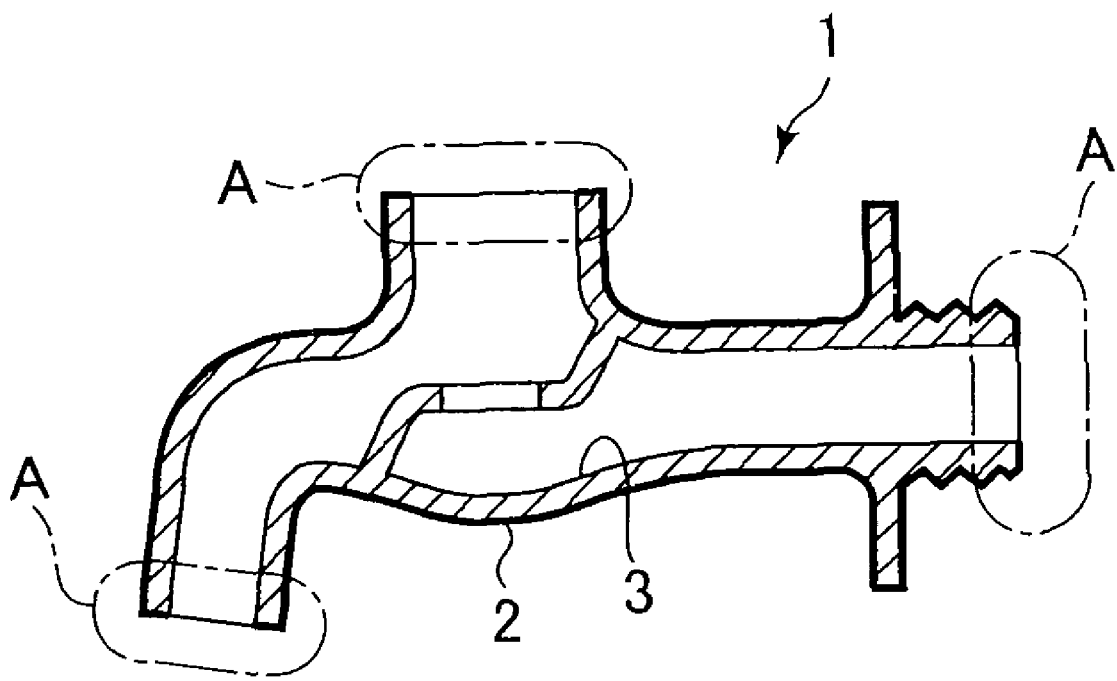
FIG. 1 is a cross section showing a JIS wall faucet (made of CAC 406) plated with nickel-chromium alloy.
Figure 2:
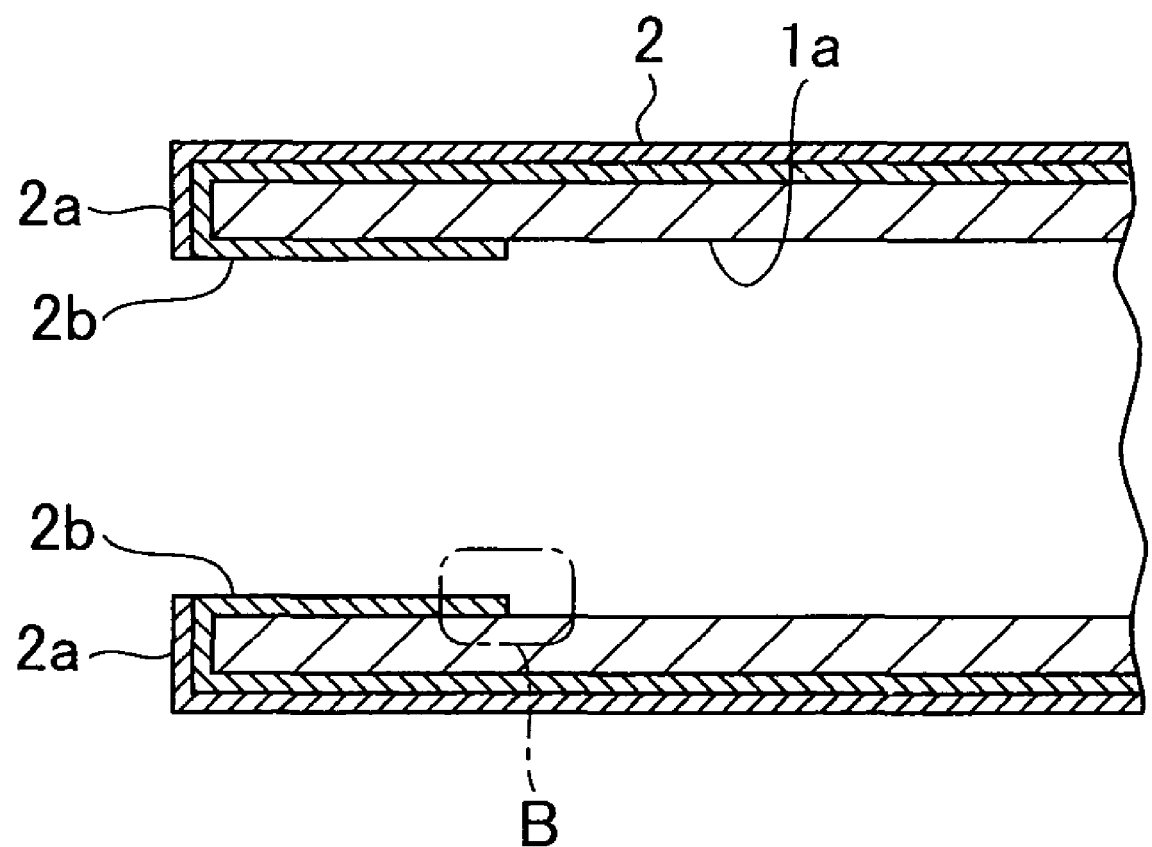
FIG. 2 is a partially enlarged cross section showing a spout section "A" shown in FIG. 1.

The elution of nickel from a water-contact instrument having undergone a plating treatment with a material containing nickel will now be described. For example, in nickel-chromium plating that is electroplating, while the water-contact instrument is immersed in a liquid for plating, a chromium layer is formed on the outer surface of the water-contact instrument facing an electrode, with nickel as a binder. On the other hand, the inner surface (water-contact surface etc.) is formed with no plated coat because it does not face the electrode. Of the water-contact surface, the spout sections "A" surrounded by dashed lines in FIG. 1 have nickel plating adhering thereto. As shown in FIG. 2, however, at the spout section of the water-contact surface 1a of the water-contact instrument 1 plated with the coat 2, the nickel coat 2b not forming a state of a composite together with the chromium coat 2a is present. This is a result of the nickel coat 2b wrapping around the spout farther inward than the chromium coat 2a due to the difference in current density range between the two.

Figure 3:
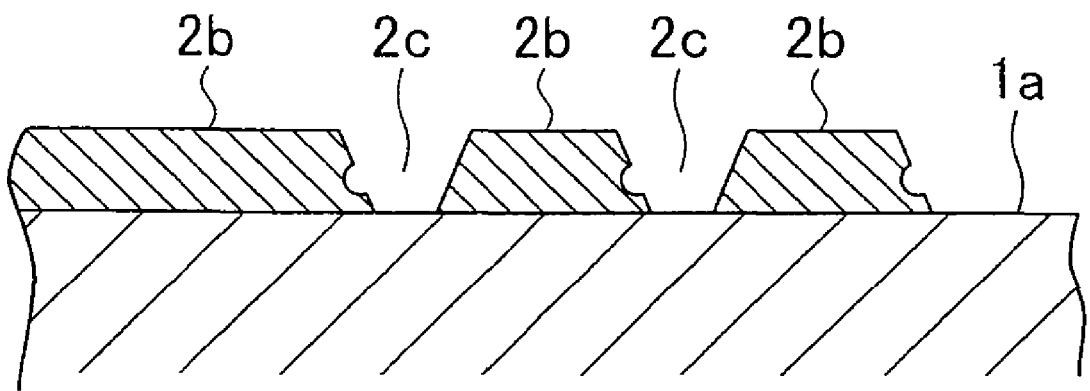
FIG. 3 is an enlarged view showing a section "B" in FIG. 2.

As described in the foregoing and as shown in FIG. 3, when copper (water-contact portion 1a) that is a metal having a high corrosion potential and nickel (nickel coat 2b) that is a metal having a low corrosion potential in contact with each other are water-contact with a fluid exhibiting good electrical conductivity, such as city water, to form an electrically conductive state, the nickel (nickel coat 2b) having a low corrosion potential is anode-polarized by the copper (water-contact portion 1a) having a high corrosion potential to give rise to a corrosion reaction and generate bimetallic corrosion that promotes oxidization and dissolution of nickel. Furthermore, the nickel coat 2b has a plurality of pinholes 2c and, of the pinholes, there exist those reaching the copper surface constituting the under layer of the nickel coat 2b. In consequence of a fluid exhibiting good electric conductivity, such as city water, having entered the pinholes, bimetallic corrosion is also generated there. Moreover, nickel is also eluted from the water-contact nickel coat 2b per se.

Figure 4:
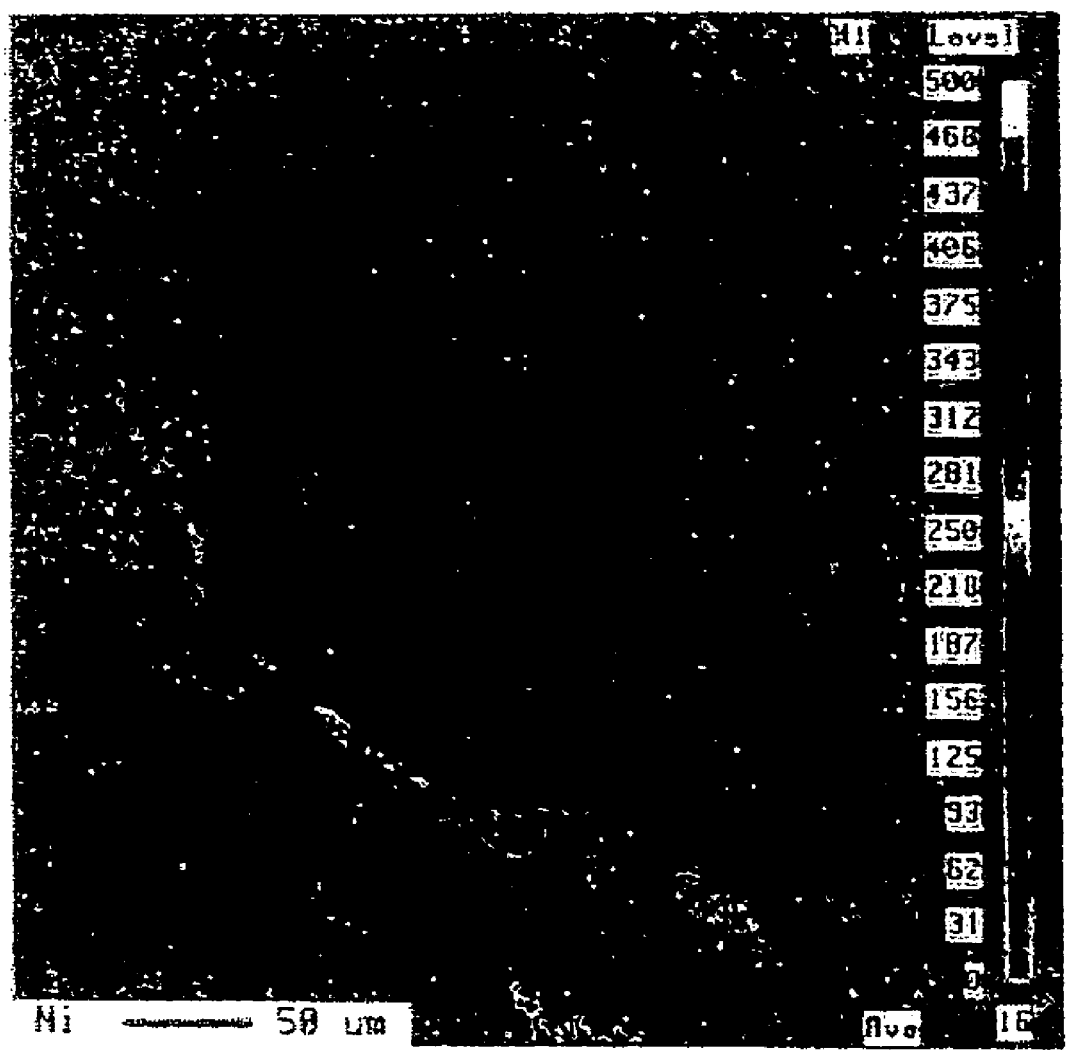
FIG. 4 is a photograph by an EPMA (Electron Probe MicroAnalyzer) showing the nickel distribution on the inner surface of a JIS wall faucet (made of CAC 406) plated with nickel-chromium alloy.
Figure 5:
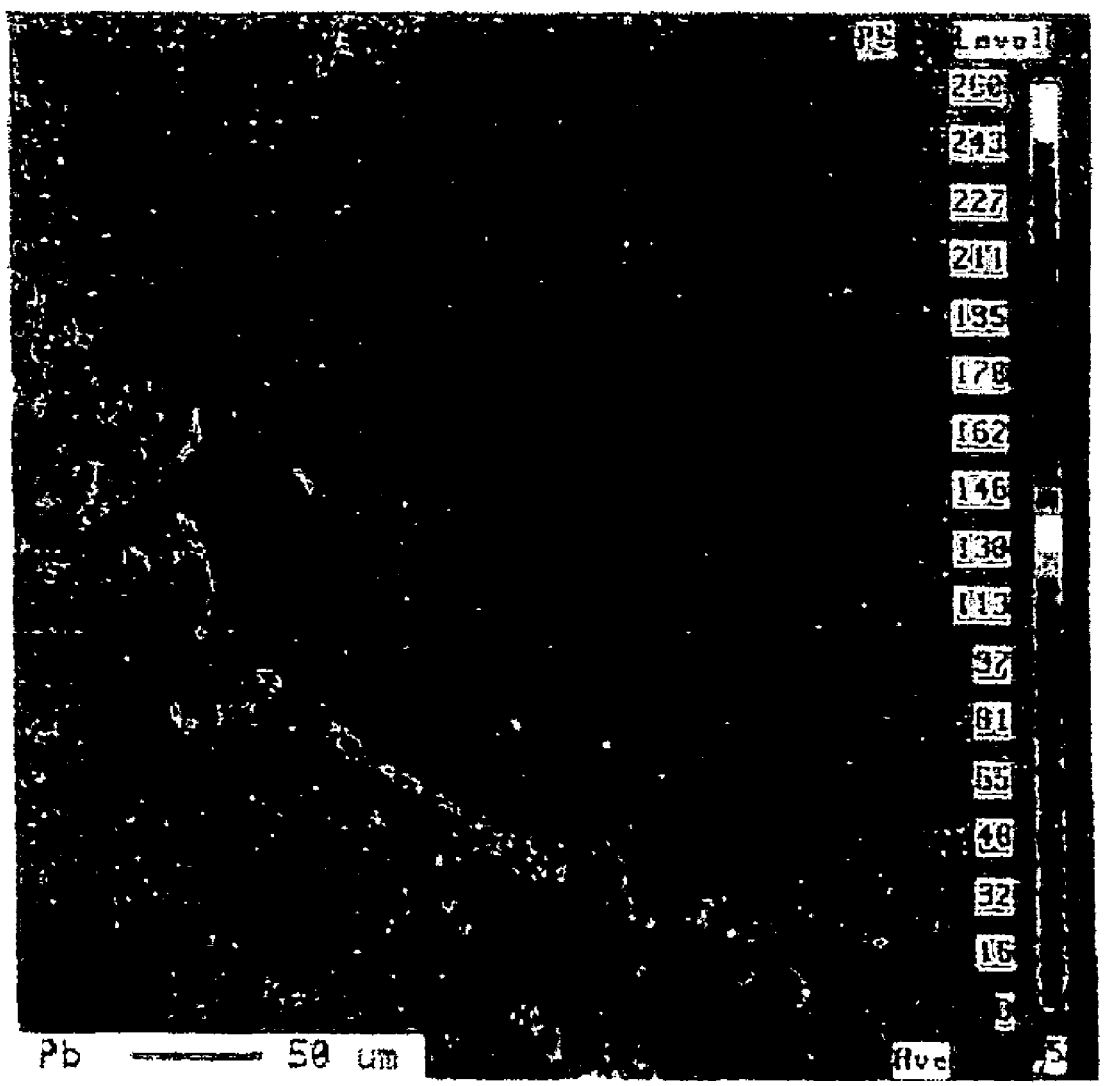
FIG. 5 is a photograph by an EPMA (Electron Probe MicroAnalyzer) showing the lead distribution on the inner surface of a JIS wall faucet (made of CAC 406) plated with nickel-chromium alloy.
Figure 6:
FIG. 6 is a micrograph by an electron microscope showing the inner surface of a JIS wall faucet (made of CAC 406) plated with nickel-chromium alloy.

In consequence of the analysis of a deeper inside of a water-contact instrument by an EPMA (Electron Probe MicroAnalyzer), as shown in FIGS. 4 to 6, the presence of nickel components can be confirmed. The nickel components are not metallic nickel used in the plating treatment, but nickel salts (nickel sulfate, nickel chloride and nickel hydroxide) contained in a plating solution, having still stayed inside the water-contact instrument even after the plating treatment, then dried and adhered to the inner surface. Valves, pipe joints, strainers, water faucet clasps or other water feeders having complicated flow paths are formed of a copper alloy material by sand casting. The casting surface thus cast is bumpy and, at the dent portions thereof, lead moved from a crystal grain boundary to the surface layer at the time of the solidification is segregated. Particularly at the inside surface layer of a water feeder not subjected to surface treatment, the segregation is conspicuous. When plating treatment is performed in this state, the plating solution stays on the lead at the dent portion and dries there and consequently it is conceivable that a nickel salt different from metallic nickel adheres to the lead. Since a water feeder, such as a water faucet clasp, has complicated flow paths and since the plating solution staying inside is difficult to eliminate, it is conceivable that adherence of the nickel salt becomes conspicuous. When a fluid, such as city water, is supplied to the water feeder in this state, both nickel salt and lead are eluted. Incidentally, the dent portions are easy to form on a water-contact surface of a mixing faucet particularly intricate in shape due to so-called flow lines formed at casting, and nickel salts are likely to adhere to the dent portions.

Figure 9:
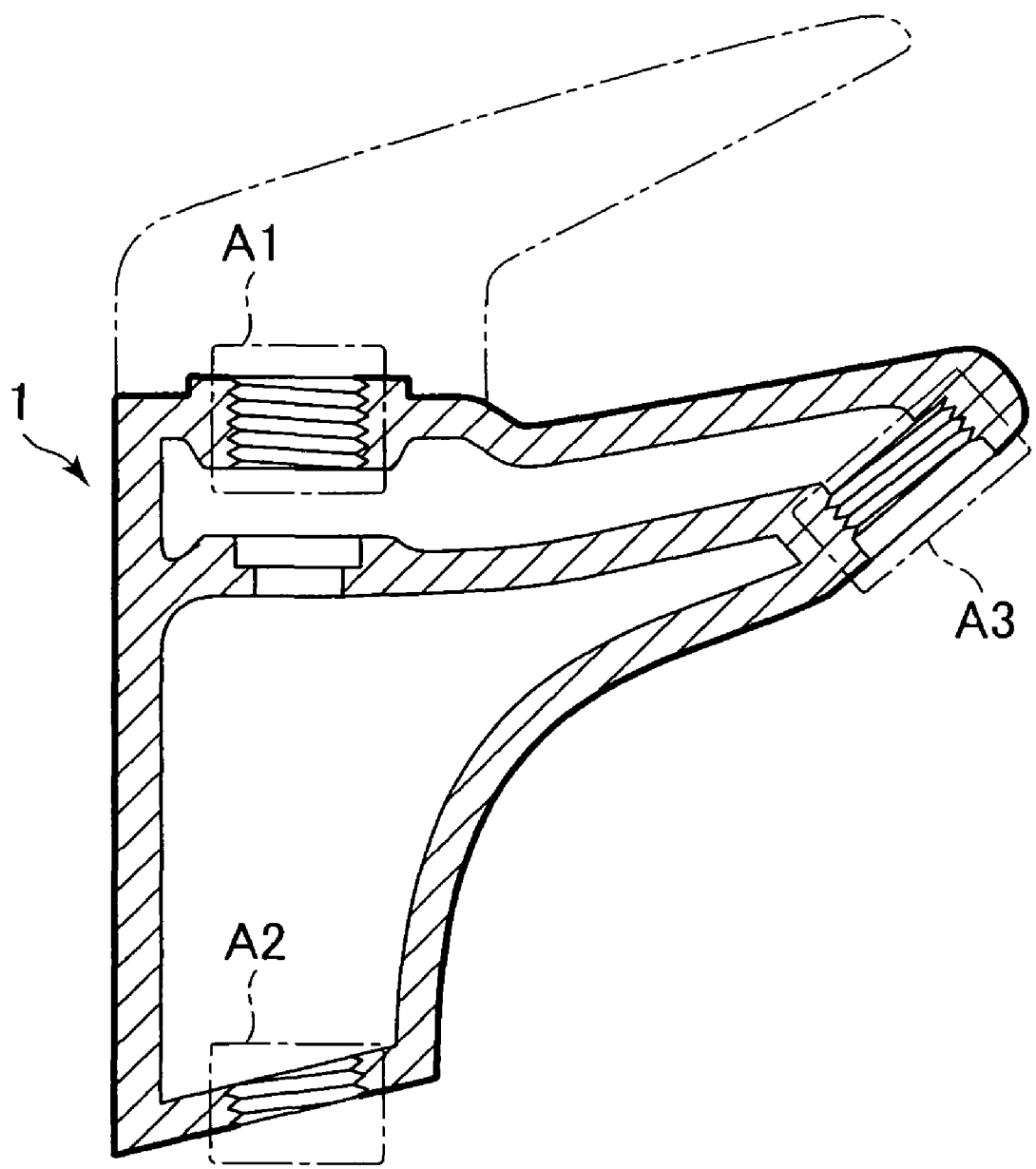
FIG. 9 is a cross section showing a commercially available single lever-type mixing faucet (made of CAC 406, having an inner volume of about 155 ml and plated with nickel-chromium alloy) used as a sample.

The results of a test for specifying a nickel-leaching source conducted will be described. In this test, the ratio between the case where the leaching source was the nickel salt adhering to the inside of a water feed as a residual and the case where the leaching source was a nickel coat at the spout of a water feeder was confirmed. FIG. 9 is a cross section showing the commercially available single lever-type mixing faucet used as a sample (a product made of CAC 406, having an inside volume of about 155 ml and treated with nickel-chromium plating). A leaching test was first performed in accordance with JIS S3200-7, with a sample not water-contact beforehand with water, to grasp the amount of nickel to be leached from the entire area of a water feeder. A sample having removed by a cutting process the portions around which a nickel coat wrapped was then prepared, and a leaching test was again performed in accordance with JIS S3200-7, with the sample not water-contact beforehand with water, to grasp the amount of nickel salts to be leached from the inside of the water feeder to which the nickel salts adhered as residuals. The portions subjected to the cutting process are regions A1 to A3 (having a surface area of about 300 mm$^2$) shown in FIG. 9. The results of the tests are shown in Table 4 (actual measurement (mg/l) of Ni and Pb leached in the nickel-leaching source-specifying tests. As shown in Table 4, the ratio of the nickel salts adhering as residuals to the inside of the water feeder to the nickel over the entire area of the water feeder (inside residual ratio) was 10 to 29%.

TABLE 4

| Sample | Leaching test (before cutting) | | Leaching test (after cutting) | | Ni inside residual ratio |
| --- | --- | --- | --- | --- | --- |
| | Ni | Pb | Ni | Pb | |
| 1 | 0.895 | 0.547 | 0.180 | 0.399 | 20% |
| 2 | 1.770 | 0.667 | 0.205 | 0.628 | 10% |
| 3 | 0.424 | 0.617 | 0.121 | 0.600 | 29% |

A nickel-removing step 16 will next be described. A water-contact instrument is immersed in a cleaning fluid containing a nitric acid and having a hydrochloric acid added thereto as an inhibitor, which fluid is contained in a treatment vessel, thereby removing nickel salts having adhered as residuals to the inside of the water-contact instrument. The cleaning fluid comprises a mixed acid of a nitric acid and a hydrochloric acid added as an inhibitor. Of the mixed acid, the nitric acid acts on nickel to effectively remove the nickel salts from the surface layer of the water-contact portion in the form of a nickel nitrate. The cleaning fluid acts also on the nickel adhering to the spout section of the water feeder and has a function to activate the nickel surface as a pretreatment of the protective film formation to be described later. As a consequence, bond between the nickel surface and the protective film is strengthened. Therefore, the nickel elution prevention method in this example adopts an organic combination of the acid cleaning treatment and the protective film formation treatment described later. When the concentration of the cleaning fluid, particularly the concentration of the nitric acid, is thin, removal of the nickel salts from the inside of the water feeder is insufficient and activation of the surface of the nickel adhering to the spout section of the water feeder is also insufficient. On the other hand, when the concentration is unduly thick, since it adversely affects the luster of the nickel coat plated on the outer surface of the water feeder that is an object to be treated, the preferable concentrations of the component acids in the acid cleaning treatment of the present embodiment are set, in which that of the nitric acid falls in the range of 0.5 to 7 wt % and that of the hydrochloric acid falls in the range of 0.05 to 0.7 wt %.

Figure 7:
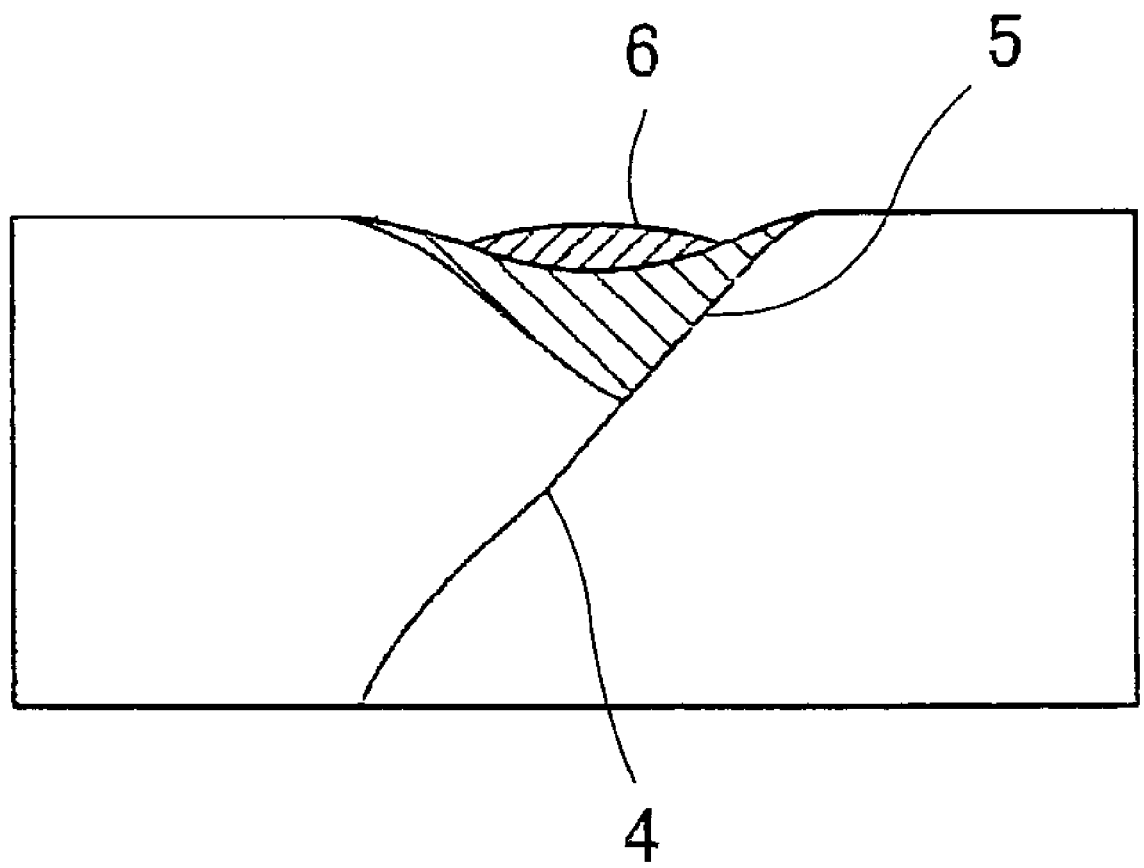
FIG. 7 is an explanatory view showing the state of existence of lead and nickel at the grain boundary of the inner surface of a water-contact instrument plated with nickel.

In the case of omitting the deleading step 13 including the case where a material having a small content of lead is an object to be treated, both lead and nickel are removed in the present step 16. While the cleaning fluid is a mixed acid comprising a nitric acid and a hydrochloric acid added thereto as an inhibitor, in the case shown in FIG. 7, the nitric acid acts first on the nickel to remove the nickel salts from the surface layer of the water-contact portion in the form of a nickel nitrate and thereafter acts immediately on the lead under the removed nickel salt to remove the lead. In this case, therefore, the single acid cleaning treatment can simultaneously remove both lead and nickel. Incidentally, since the cleaning fluid used in the nickel-removing step 16 has been described in detail in the deleading step 13, the description thereof is omitted here. In addition, since nickel is a corrosion resistant material relative to an alkali, such as a sodium hydroxide, and a hydrochloric acid, the solutions thereof cannot remove nickel irrespective of the concentrations thereof and temperatures involved.

The desirable temperature and time in the acid cleaning treatment will be described. The desirable treatment temperature "x" is in the temperature range expressed as $10°$ C.$\leq x \leq 50°$ C. An appropriate temperature range is a room-temperature range that is defined by the range of temperatures taken in a state of the cleaning fluid neither cooled nor heated and variable depending on the temperature of a water-contact instrument to be treated and on the atmosphere of the treating vessel exterior. A specific range is from $10°$ C. to $30°$ C., and the optimal temperature is $25°$ C. The desirable treatment time "y" is in the range expressed as 5 min$\leq y \leq$30 min.

When the treatment temperature exceeds $50°$ C., air bubbles by boiling begin to be conspicuous in the cleaning fluid, and air pockets are likely to be formed in the water-contact instrument to be treated, with the result that surface portions of the water-contact instrument not water-contact with the cleaning fluid will possibly exist. Also, evaporation of water and acids will become vigorous, the concentration of the cleaning fluid will become difficult to manage, and the evaporation of the acids will deteriorate the treatment task environment. Therefore, it will be necessary to implement countermeasures to acid resistance for the treatment task area and the task workers. On the other hand, when the treatment temperature falls short of $10°$ C. during the cleaning treatment in winter, the introduction of the cooled water-contact instrument into the treating vessel will possibly decrease the temperature of the cleaning fluid to nearly $0°$ C. to freeze the cleaning fluid. Therefore, the present invention contemplates maintaining the temperature of the cleaning fluid at $10°$ C. or more at which there is no possibility of the cleaning fluid being frozen even when water-contact instrument are put into commercial cleaning treatment. In addition, when the treatment time exceeds 30 min, the overage will not contribute too much to the enhancement of the deleading efficiency. Furthermore, the time overage is not adequate to the commercial cleaning treatment. On the other hand, if the treatment time falls short of 5 min, this short-time treatment is insufficient for the elution prevention even when the treatment temperature is elevated. For this reason, the present invention contemplates the treatment time of at least 5 min though this is not limitative.

The acid cleaning treatment is also applicable to existing water-contact instruments. When the existing water-contact instrument is a valve, for example, since nonmetallic parts including packing, gaskets, etc. are also immersed in the cleaning fluid, deterioration thereof is conceivable depending on the cleaning time and temperature and the concentration of the cleaning fluid. In this case, parts made of a material resistant to chemicals, such as fluorine rubber, may be used.

While the cleaning fluid used in the acid cleaning treatment of this example contains a hydrochloric acid as an inhibitor, an organic acid, such as an acetic acid or a sulfamic acid, may be mixed with a nitric acid into a mixed acid to remove lead and nickel using the mixed acid.

After the acid cleaning treatment, the nickel- and lead-leaching tests were conducted. The test results will be described here. The acid cleaning treatment as the nickel-removing step was performed using the sample used in the nickel-leaching source-specifying tests. As a result, it was confirmed that almost all nickel salts adhering as a residual to the inside of the water feeder was removed. In the acid cleaning of the leaching tests, a mixed acid of 4 wt % of a nitric acid and 0.4 wt % of a hydrochloric acid was used. The test results are shown in Table 5 (amounts (mg/l) of Ni and Pb leached after the acid cleaning treatment). As shown in the table, the amount of Ni leached (end offset of plumbing instrument) satisfies the leaching standard of 0.001 mg/l and the amount of Pb leached (end offset) also satisfies the leaching standard of 0.007 mg/l.

TABLE 5

| | Ni | | Pb | |
|---|---|---|---|---|
| Sample | Actual measurement (a) | End offset (a)*155/1000 | Actual Measurement (b) | End offset (b)*155/1000 |
| 2 | 0.006 | 0.00093 | 0.009 | 0.00140 |
| 3 | 0.005 | 0.00078 | 0.010 | 0.00155 |

The water-contact instrument is washed with water at the water-washing step 17 after the nickel-removing step to rapidly deprive the surface thereof of the cleaning fluid. Subsequently, the protective film formation treatment is performed at the protective film formation step 18. A protective film-forming agent used at the protective film formation step 18 contains at least one species selected from the group consisting of benzotriazole, benzotriazole derivatives and organic acids. Examples of the benzotriazole derivatives include tolyltriazole and carboxybenzotriazole. Examples of the organic acids include straight chain saturated fatty acids like a stearic acid belonging to a carboxylic acid and straight chain unsaturated fatty acids like an oleic acid. As specific examples thereof, a decanoic acid, undecanoic acid, dodecanoic acid, tridecanoic acid, tetradecanoic acid, pentadecanoic acid, stearic acid, heptadecanoic acid, hexadecanoic acid, octadecanoic acid and nanodecanoic acid can be raised.

In particular, a protective film-forming agent containing benzotriazole, though adopted at the protective film formation step 1 of the example, is preferred. The reason for it lies in an excellent force of bonding with nickel. Benzotriazole is bonded to the surface of a coat, with a benzene ring having a water-shedding effect (water-repellent property) directed outward and a hydrophilic group directed inward (to the coat side). For this reason, the bonding with the nickel coat can be materialized and, therefore, it is made possible to form a protective film bonded firmly to the nickel coat. Since an organic acid is bonded to a nickel coat, with alkane ($C_nH_{2n+2}$) having a water-repellent property also directed outward and a hydrophilic group also directed inward, intimate bonding thereof with the nickel coat can be acquired. The force of bonding with the coat surface is obtained in the case of an organic acid due to the delocalization of only the hydrophilic group of the molecules constituting the protective film (motion of electrons), whereas in the case of benzotriazole, it is obtained due to the delocalization of the entire molecules including the benzene ring. That is to say, by using a protective film-forming agent possessing a molecular structure having the portion of bonding with the nickel coat highly delocalized, intimate bonding can be attained. Therefore, the protective film-forming agent containing benzotriazole is preferred in the point of the strengthened bonding with the nickel coat interdependently with the activation by the acid cleaning treatment. Incidentally, organic substances other than heterocyclic compounds including benzotriazole, benzotriazole derivatives and thiazole or the components enumerated above as the organic acids can be adopted as the protective film-forming components insofar as they can intimately be bonded to the surface of the nickel coat. The chemical structures of benzotriazole and organic acids are shown below.

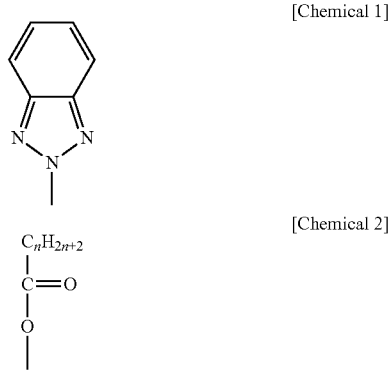

[Chemical 1]

[Chemical 2]

$C_nH_{2n+2}$
|
C=O
|
O
|

When preparing the protective film-forming agent, organic solvents, such as glycol ethers, alcohols and amines capable of dissolving the protective film-forming components in water, are used. As the glycol ethers, 3-methyl-3-methoxybutanol and butylcellsolve can be raised. Benzylalcohole can be cited as the alcohols. Amines include morpholine, monoethanolamine, triethanolamine, alcanolamines having an isoform, such as triisopropanolamine, amines having a cycloform, such as cyclohexylamine and dicyclohexylamine, and long-chain alcohol amines.

Figure 10:
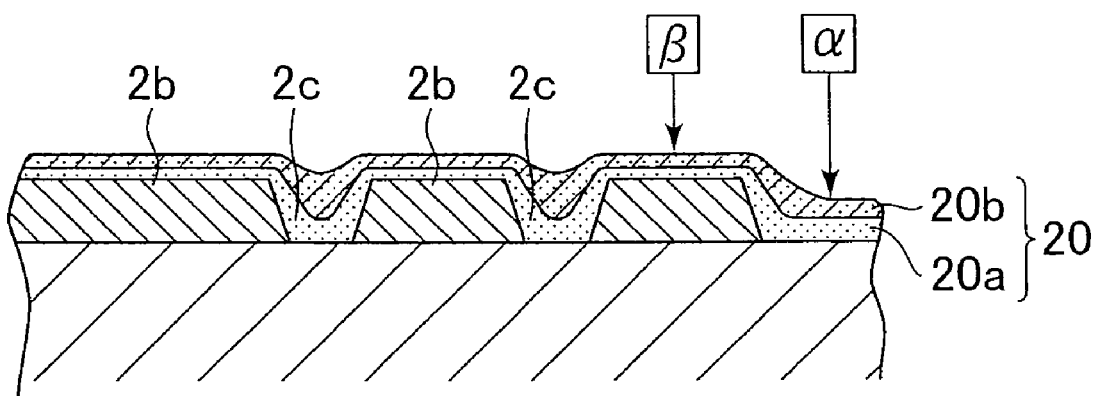
FIG. 10 is a cross-sectional explanatory view showing the state of the surface layer of the water-contact part having encountered a protective film formation treatment.

At least on the water-contact surface 1a of the water-contact instrument 1 immersed in the protective film-forming agent, a protective film 20 is formed as shown in FIG. 10. As a result, the protective film 20 is formed on the surface of the nickel coat 2b on the water-contact section 2b and, moreover, the protective film-forming agent enters the small pinholes 2c of the nickel coat 2b. Therefore, the water-contact portion 1a and the nickel coat 2b attached to the water-contact portion 1a are insulated to prevent both nickel leaching by bimetallic corrosion and nickel leaching from the nickel coat 2b per se when being water-contact with a solution.

The protective film based on the protective film-forming agent is formed on the water-contact section at the spout of the water feeder and also on the water-contact surface inside the water feeder. Therefore, the lead segregated on the surface layer of the water-contact portion is removed at the deleading step 13, and the nickel salts formed inside the water feeder are removed at the nickel-removing step 16. When the protective film-forming agent is formed preponderantly of benzotriazole alone, the protective film is formed into a monolayer protective film (protective film 20a in FIG. 10). When the protective film-forming agent is formed preponderantly of benzotriazole plus an organic acid, the protective film is formed into a bilayer protective film (protective films 20a and 20b in FIG. 10) or into a composite protective film in a suitable fashion. When the protective film 20 is formed into a bilayer protective film, as shown in FIG. 10, the protective film 20b of the organic acid is deposited on the protective film 20a of the benzotriazole, resulting in the firmly attached protective film to enable prevention of nickel leaching.

The presence and thickness of the protective film were confirmed using an XPS (top surface hyphenated analytical instrumentation) and an FT-IR (Fourier Transform-Infrared Radiation) spectroscopy analyzer. The explanation thereof is given as follows.

Test 1: Confirmation of Presence of Protective Film on Copper Alloy and Nickel Coat (1) Test Purpose While it is a conventionally well-established concept that a protective film cannot be formed on so-called metallic nickel, the concept is verified.

(2) Sample

Test pieces of copper plate (purity: 99.99%) and of pure nickel steel plate (purity: 99.98%) were immersed in an aqueous solution of 1 wt % of benzotriazole at a treatment temperature of 50° C. for a treatment time of 5 min. The test pieces were prepared as samples corresponding to parts α and β in FIG. 10 and having the protective film 20a of benzotriazole formed thereon. The test piece of pure nickel steel plate was the same as sample No. 21 in Table 8 that was the data of the example to be described later. The aqueous solution of benzotriazole used in this test is an aqueous solution containing a solvent for dissolving benzotriazole in water. This is the same as in the verification test in the prior art described earlier and in tests described later.

(3) Measurement Method

A top surface hyphenated analytical instrumentation (XPS) VG Scientific ESCALAB250 having pass energy (resolution) of 100 eV was used as equipment used. The analysis region (about 0.4 mm) on the samples accommodated in a vacuum chamber was irradiated with X-rays (Al monochromatic X-ray source, 15 kV, 100 W), with the binding energy thereof varied. The texture and chemical bonding state of the analysis region surface were grasped from the detection of a photoelectron spectrum peculiar to each element emitted from the analysis region surface as the sensitivity (kCPS).

(4) Measurement Results

Figure 11:
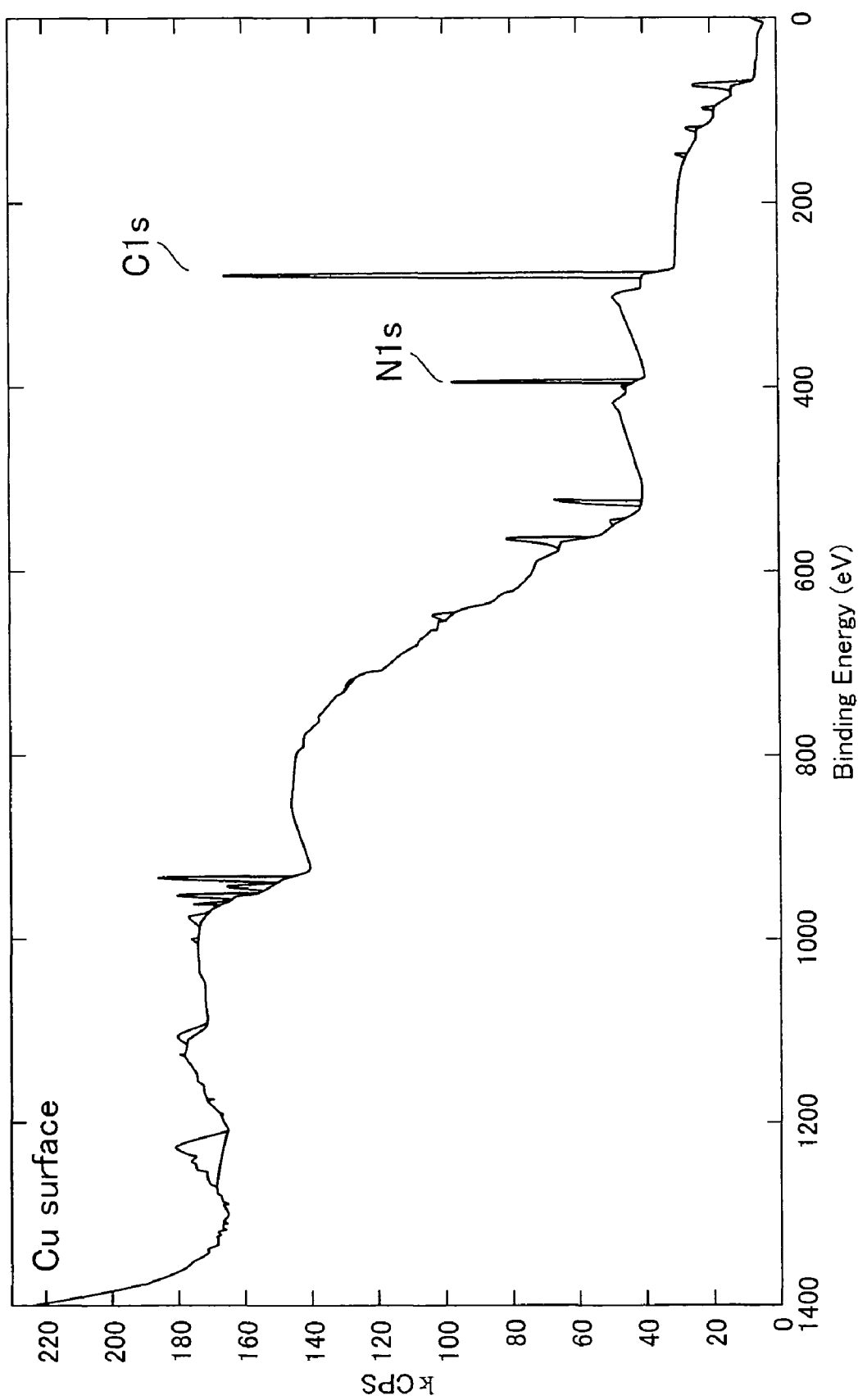
FIG. 11 is a graph showing the entire qualitative analysis results having detected as sensitivity (kCPS) photoelectron spectra peculiar to elements emitted from a surface (copper plate) in an analysis region using a top surface hyphenated analytical instrumentation (XPS=X-ray Photoelectron Spectroscopy).

As regards copper plate treated by immersion in benzotriazole:

By irradiating X-rays, with the binding energy increased gradually, as shown in FIG. 11, the spectrum "C1s" was detected. By further strongly irradiating the X-rays, the spectrum "N1c" was detected at a region of the copper alloy side slightly deeper than the region at which "C1s" was detected. It was confirmed from the detection of "C1s" that C (carbon) of the benzene ring forming a protective film surface of benzotriazole existed. It was also confirmed from the detection of "N1s" that the nitrogen compounds bonding the benzene ring to the copper-based alloy existed. Thus, it was confirmed that the protective film of benzotriazole was formed on the surface of the copper plate.

Figure 12:
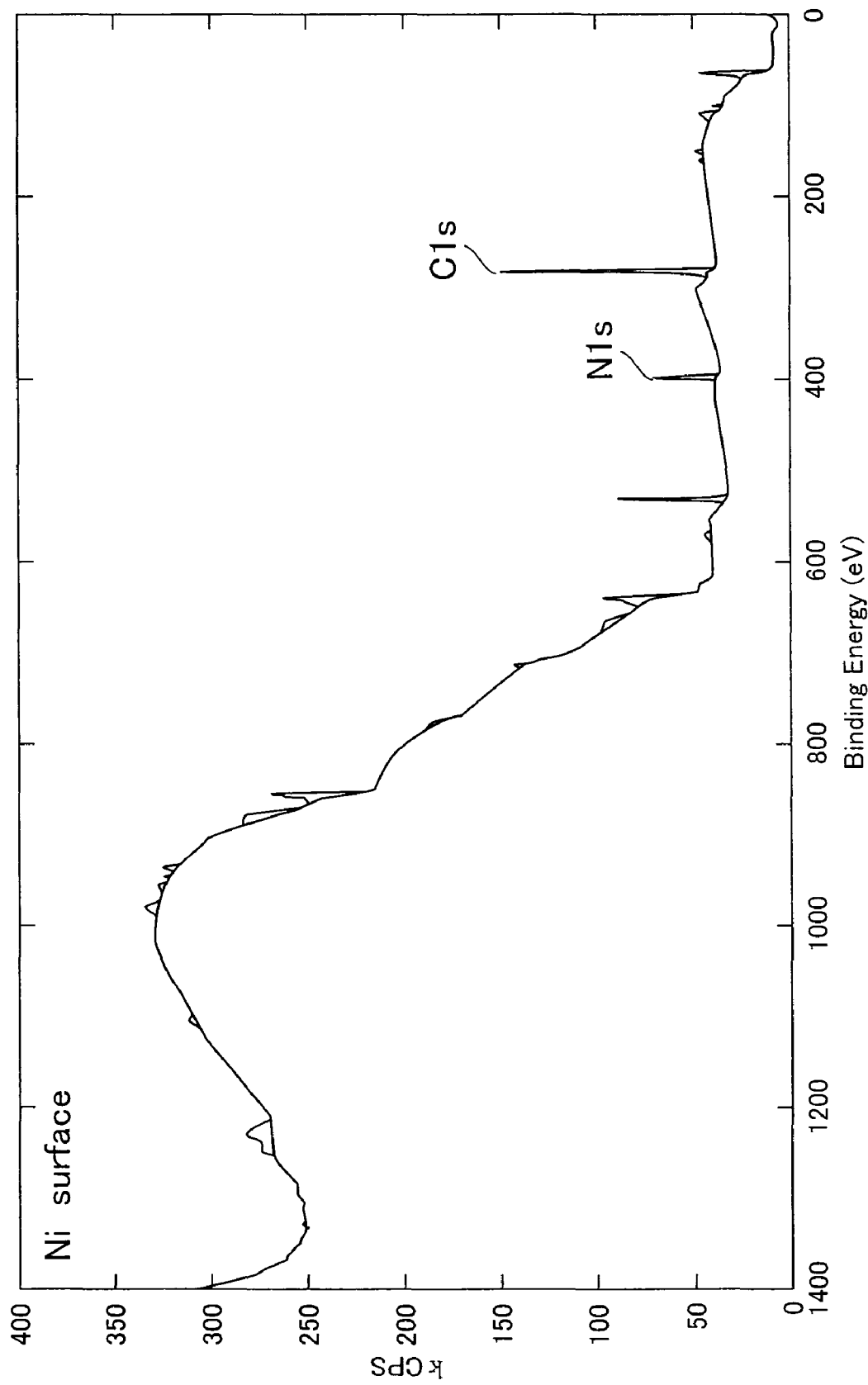
FIG. 12 is a graph showing the entire qualitative analysis results having detected as sensitivity (kCPS) photoelectron spectra peculiar to elements emitted from a surface (pure nickel-copper plate) in an analysis region using a top surface hyphenated analytical instrumentation (XPS).

As regards pure nickel steel plate treated by immersion in benzotriazole:

By irradiating X-rays, with the binding energy increased gradually, as shown in FIG. 12, the spectrum "C1s" was detected. By further strongly irradiating the X-rays, the spectrum "N1c" was detected at a region of the copper alloy side slightly deeper than the region at which "C1s" was detected. Since the sensitivity of each spectrum was weaker than that of the copper plate, it could be inferred that the thickness of the protective film was slightly smaller than that in the case of the copper plate. However, the detection of "C1s" and N1s" at the same positions (depths) as in the case of the copper plate demolished the conventionally well-established concept that a protective film could not be formed on metallic nickel and confirmed anew that the protective film of benzotriazole was formed on the surface of nickel.

Test 2: Confirmation of Presence of Protective Film on Copper Alloy and Nickel Coat (1) Test Purpose The formation of a protective film on metallic nickel is confirmed, with a protective film-forming agent changed. The thickness Of each protective film on the surface of copper alloy and nickel coat is also confirmed.

(2) Sample

A sample of copper alloy (CAC 406) subjected to electrolytic plating with nickel (Ni thickness: 2 to 3 µm), part of which was polished to expose the copper alloy was treated by immersion in a treatment fluid containing a protective film-forming agent comprising 0.5 wt % of benzotriazole, a stearic acid and a small amount of oleic acid at a treatment temperature of 50° C. for a treatment time of 5 min. The test piece was prepared as a sample corresponding to parts α and β in FIG. 10 and having the protective film 20 of benzotriazole and organic acids formed thereon. This test piece is the same as sample No. 14 in Table 6 that is the data of the example described later. The treatment fluid in this test is an aqueous solution containing a solvent for dissolving the protective film formation components, such as benzotriazole, in water, 0.7 wt % or more of stearic acid and 0.3 wt % or less of oleic acid exclusive of 0 wt % thereof. This is the same as in the verification test in the prior art described earlier and in tests described later.

(3) Measurement Method

It uses the same top surface hyphenated analytical instrumentation (XPS) as in Test 1.

(4) Measurement Results

Figure 13:
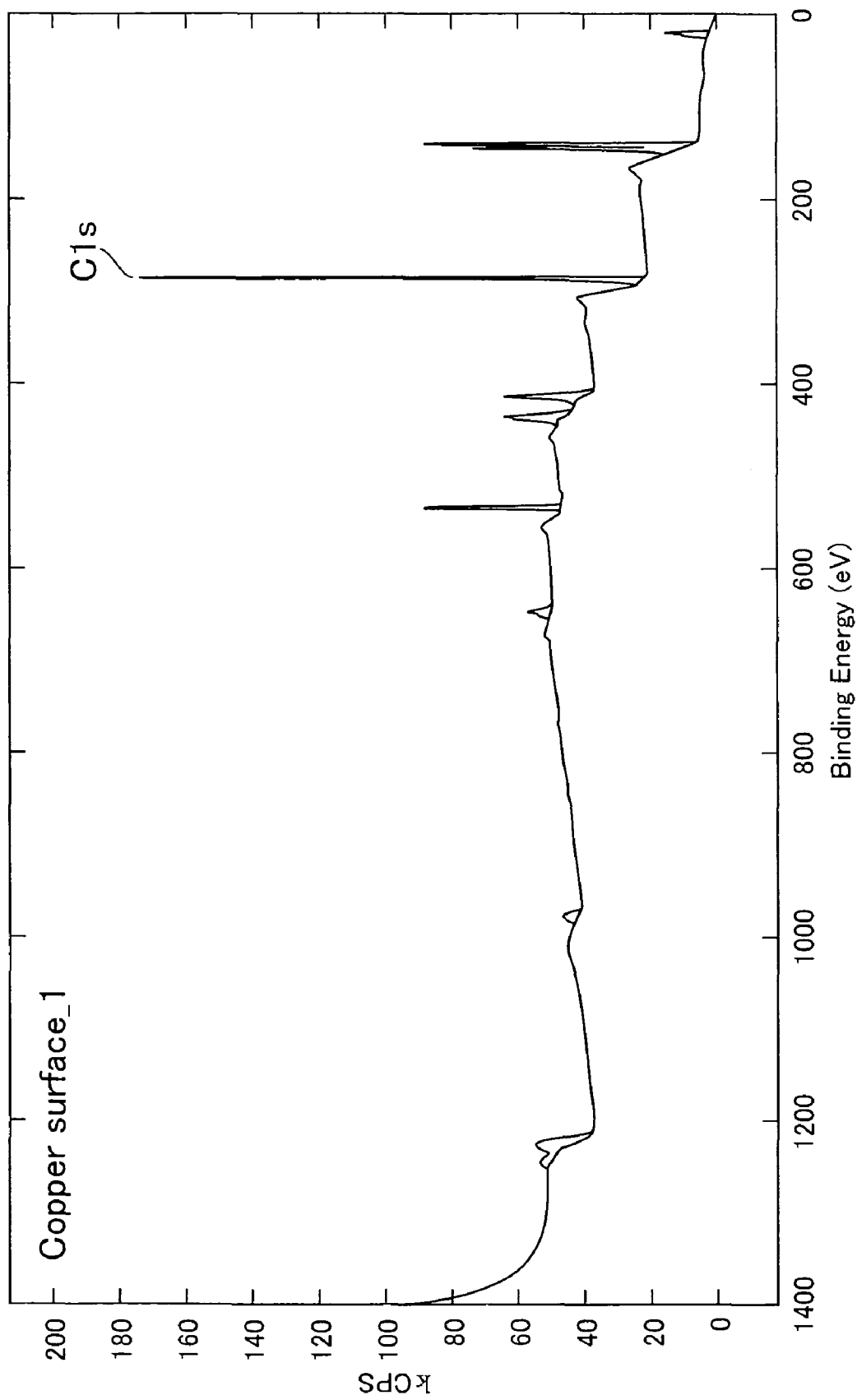
FIG. 13 is a graph showing the entire qualitative analysis results having detected as sensitivity (kCPS) photoelectron spectra peculiar to elements emitted from a surface (copper alloy) in an analysis region using a top surface hyphenated analytical instrumentation (XPS).

As to copper alloy surface:

By irradiating X-rays, with the binding energy increased gradually, as shown in FIG. 13, the spectrum "C1s" was detected at the same position (depth) as that in the case of the test piece of FIG. 11 having the protective film of benzotriazole formed thereon. While it was confirmed from this fact that C (carbon) existed on the surface of the copper alloy, no spectrum "N1s" as was confirmed in the test piece of FIG. 11 was detected even by further irradiating X-rays strongly. Thus, in this measurement, the presence of the protective film of benzotriazole on the surface of the copper alloy could not be confirmed. In spite of the fact that the formation of the protective film of benzotriazole on the surface of the copper alloy was confirmed in the test of FIG. 11, it was inferred from no detection in this test is that the spectrum "C1s" was due to the stearic acid and oleic acid. It was conceivable that since the protective film of the stearic acid and oleic acid was thick, no spectrum "N1s" of the benzotriazole existing on the deeper portion of the copper alloy side than the "C1s" detected region could be detected. The chemical formulae of the stearic acid and oleic acid are shown below.

Figure 14:
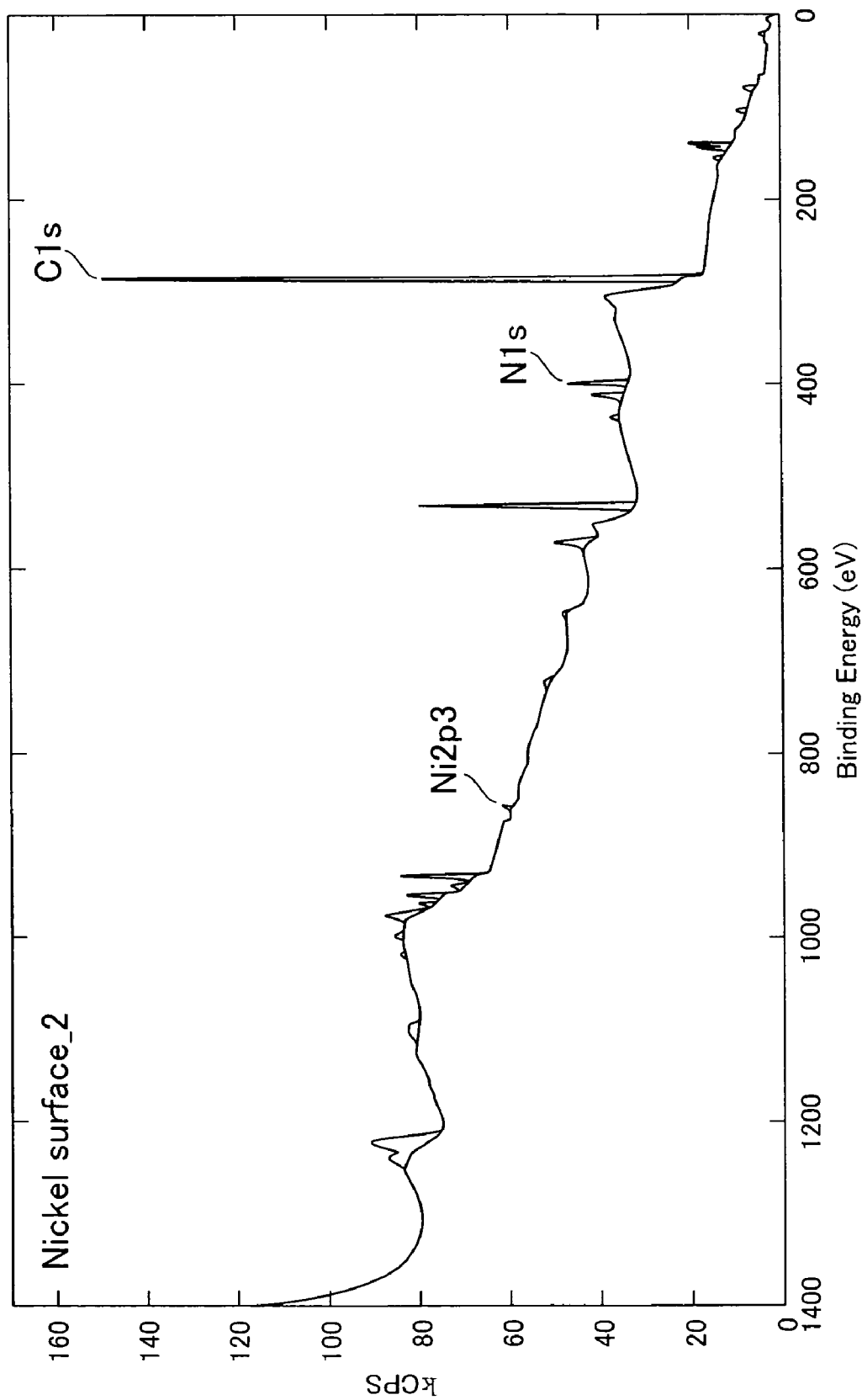
FIG. 14 is a graph showing the entire qualitative analysis results having detected as sensitivity (kCPS) photoelectron spectra peculiar to elements emitted from a surface (nickel) in an analysis region using a top surface hyphenated analytical instrumentation (XPS=X-ray Photoelectron Spectroscopy).

Chemical formula of stearic acid: $C_{17}H_{35}COOH$
Chemical formula of oleic acid: $C_{17}H_{33}COOH$ As to nickel surface:

Irradiation of X-rays, with its intensity changed, resulted in detection of "C1s" and "N1s" shown in FIG. 14 at the same positions (depths) as in the test piece of FIG. 12 having formed the protective film of benzotriazole. It was confirmed anew from the detection that the protective film of benzotriazole was formed on the metallic nickel. When a spectral response of "C1s" was focused on, here, the value thereof detected was much higher than that of the test piece of FIG. 12. It was therefore inferred that the protective film of benzotriazole and a protective film composed of the stearic acid and oleic acid coexisted on the nickel surface. When irradiating X-rays further strongly, a spectrum "Ni2p3" was detected on the side of the copper alloy at a region slightly deeper than the "N1s" detection region. It was confirmed from this fact that the thickness of the protective film composed of benzotriazole or stearic acid and oleic acid and formed on the nickel surface was slightly smaller than that of the protective film of benzotriazole or stearic acid and oleic acid and formed on the copper alloy surface.

Next, as regards the inference that the protective film composed of stearic acid and oleic acid was formed on the protective film composed of benzotriazole, the presence thereof was confirmed by the infrared spectroscopic analysis.

Test 3: Confirmation of Presence of Protective Film on Copper Alloy and Nickel Coat (1) Test Purpose:

It is verified if a protective film composed of stearic acid and oleic acid exists on the protective film of benzotriazole.

(2) Sample:

It is the same as the test piece immersed in 0.5 wt % of benzotriazole plus stearic acid plus oleic acid.

(3) Measurement Method

The equipment used is Fourier Transform Infrared Radiation (FT-IR) spectroscopy analyzer Nicolet Nexus 670 having a resolution of 4 cm$^{-1}$ and a quantity survey of 64 times. By making use of the property that a molecule existing in an analysis region absorbs infrared rays corresponding to vibrational energy when irradiating the infrared rays (laser beams) on the analysis region of a sample accommodated in a vacuum chamber, with their wavenumbers varied, to detect an infrared absorption spectrum (absorbance) (infrared absorption wavenumber) peculiar to each element, the qualitative analysis of the analysis region surface is executed.

(4) Measurement Results:

In re the results of analysis of the protective film formation agent:

As shown in FIG. 15(a), the peak waveform of the absorption spectrum in the vicinity of a region "ア" is substantially in conformity with that of benzotriazole, indicating that benzotriazole exists in the protective film formation agent. The peak waveforms of the absorption spectra in the vicinity of regions "イ" and "ウ" are in conformity with that of a stearic acid ester simple, indicating that stearic acid exists in the protective film formation agent.

In re the results of analysis of the nickel surface:

The peak waveforms of the absorption spectra in the vicinity of regions "イ" and "ウ" are in conformity with that of the protective film formation agent, as shown in FIG. 15(b). This indicates that a protective film of stearic acid is formed on the nickel surface. Here, since the peak waveform of the absorption spectrum in the vicinity of the region "イ" was that overlapping the peak waveform of the absorption spectrum of an oleic acid simple, it was found that the protective film of oleic acid was also formed on the nickel surface. Incidentally, though the absorption spectrum of benzotriazole is found in the vicinity of the region "ア", the spectral intensity thereof is weak.

Figure 15:
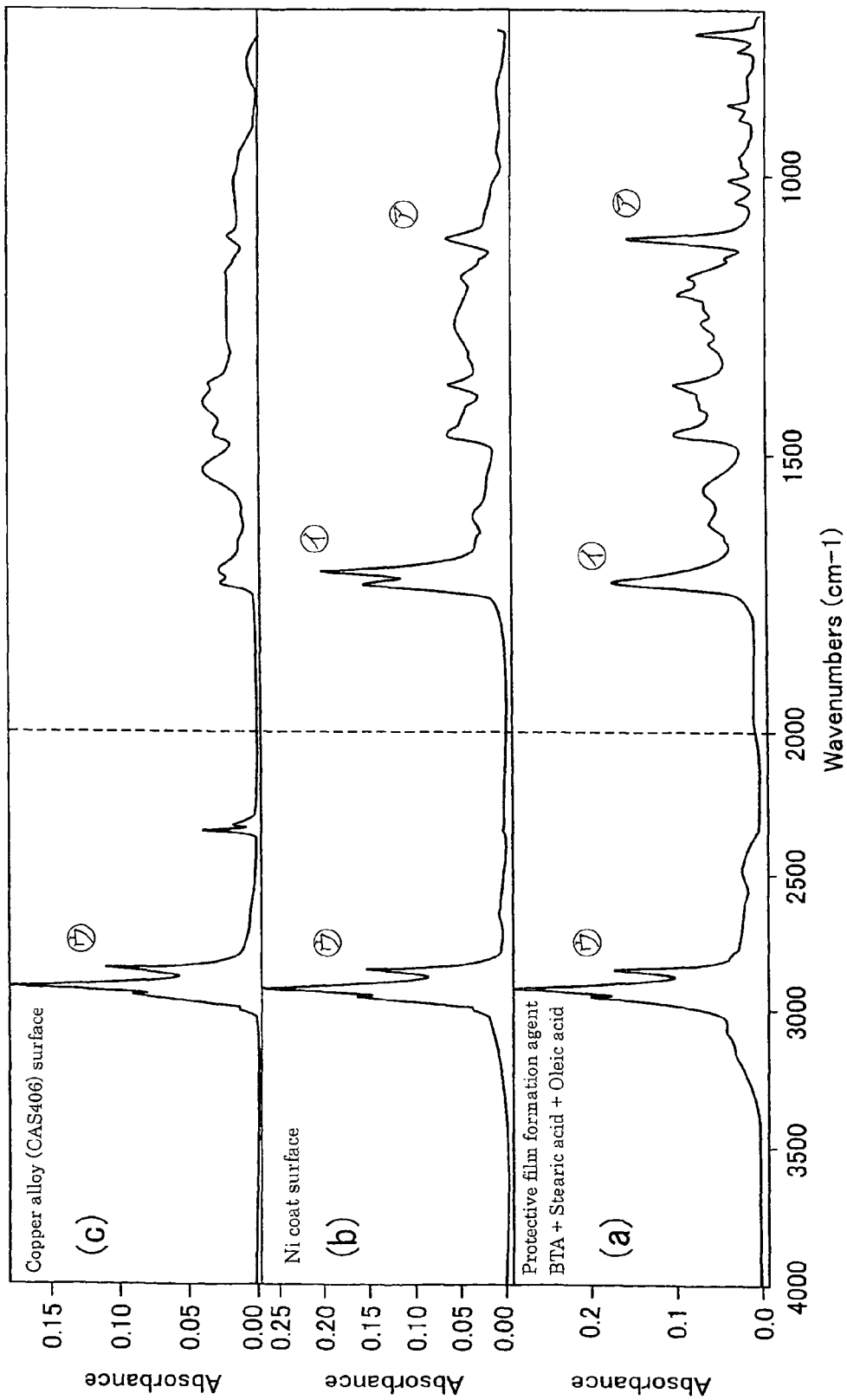
FIG. 15 is a graph showing the qualitative analysis results of a surface in an analysis region using a Fourier Transform-Infrared Radiation (FT-IR) spectroscopy analyzer.

In re the results of analysis of the copper alloy surface:

The peak waveform of the absorption spectrum in the vicinity of the region "ウ" is substantially in conformity with that of the protective film formation agent as shown in FIG. 15(c). This shows that a protective film of oleic acid is formed on the copper alloy surface. Incidentally, no absorption spectrum corresponding to that of oleic acid found on the nickel surface "イ" shown in FIG. 15(*b*) could not be detected. Furthermore, the absorption spectrum of benzotriazole dose not clearly emerge, a protective film of benzotriazole is present as described above.

After the protective film formation step 18, as shown in FIG. 8, drying is carried out at the drying step 19. The drying step 19 evaporates the water content in the protective film-forming agent to fix a protective film of benzotriazole or organic acid firmly to the surface of the copper alloy or nickel coat. Particularly, an organic combination of the acid-cleaning process and the protective film-forming process manifests a synergistic effect by the cleaning fluid and, as a result, a product or member having a protective film formed thereon at the protective film formation step 18 exhibits an extremely excellent effect of preventing nickel leaching. A container having undergone all the steps is conveyed to an assembly step, and the water-contact instrument (valve parts in this example) is removed from the container and then subjected to assembly and inspection.

Also, this example takes into consideration environmental issues and wastewater treatment cost. As described above, while an alkali detergent is adopted at the degreasing step 10 of this example, a mixed acid of a nitric acid (concentration: 0.5 wt % to 7 wt %) and a hydrochloric acid (concentration: 0.05 wt % to 0.7 wt %) is used at the deleading step 13 and nickel-removing step 16. That is to say, as shown in FIG. 8, the alkali detergent contaminated at the degreasing step 10 and the mixed acid solution containing heavy metal at the deleading and nickel-removing steps can react with each other to attain a neutralization process. Precipitates and supernatants can be removed as solids. The oil content can be separated and be subjected to industrial waste disposal. The harmless neutralized water can be leveraged as industrial water. Furthermore, as shown in FIG. 8, the diluted alkaline wastewater discharged from the water washing step 11 after the degreasing step 10 and the diluted acidic wastewater discharged from the water washing step 14 after the deleading step 13 and from the water washing step 17 after the nickel-removing step 16 can be mixed to attain a neutralization process, the precipitates and supernatants can be removed as solids, and the oil content can be separated and subjected to industrial waste disposal. The neutralized water now harmless can be leveraged as industrial water.

Furthermore, the protective film formation process of the present invention is applicable to existing assembled and completed products, such as valves, water faucets, etc., having not undergone a nickel-removing step. In this case, the assembled and completed product is degreased and then subjected to a protective film formation treatment. Since the protective film-forming agent of the present invention has no corrosion behavior and has no possibility of packing or gasket that is nonmetal and is incorporated in a valve, water faucet, etc. being deteriorated. This is why the protective film formation treatment can be made relative to the completed products. Incidentally, while a protective film is formed through immersion of a water-contact part or completed product in the protective film-forming agent, a spraying treatment may be adopted relative to a water-contact part having an internal shape liable to produce air pockets in the case of the immersion treatment.

It was found from the tests for specifying a nickel-leaching source described above that in the samples that are the water feeders (mixing faucets), those having a spout as the nickel-leaching source occupied about 70%. In view of this, to further pursue whether leaching of nickel from the spout of the water feeder was based on direct leaching from the metallic nickel in the region of the coat or on the bimetallic corrosion due to the potential differential, samples were subjected to the following leaching test.

(1) Test Purpose:

It was verified whether leaching of nickel from the spout of the water feeder was based on direct leaching from the metallic nickel in the region of the coat or on the bimetallic corrosion due to the potential differential.

(2) Sample:

A plate member having a base metal material of CAC 406 subjected to electrolytic nickel-plating over the entire surface thereof (coat thickness: 2 to 3 μm) was identified as test piece X1 and that subjected to electroless nickel-plating (coat thickness: about 10 μm) as test piece X2. Test piece X1 had a coat thickness of 2 to 3 μm to reproduce the degree of adhesion of a nickel coat to the spout of a water-contact instrument and was produced so as to form in the surface thereof a plurality of minute pinholes as shown in FIG. 3. Since, in the electroless nickel-plating, pinholes are more difficult to form than in the electrolytic nickel plating and the adhesion of a nickel coat is better than in the electrolytic nickel plating, test piece X2 was treated as a comparative example. Furthermore, a plate member of pure nickel steel (purity: 99.98%) was prepared as test piece Z. Incidentally, test piece X1 corresponds to sample No. 4 in Table 6 showing the data of the examples to be described later, test piece X2 to sample No. 10 in the same table and test piece Z to sample No. 18 in Table 8. The four sides of each test piece on both front and back surfaces thereof were masked as shown in FIG. 16(*a*) to form a rectangular in water-contact region of a constant area to be in water-contact. This masking of the sides of a test piece eliminates unhomogeneous thickness and state of the nickel coats at these sides. While in the leaching test using commercially available water feeders as samples, errors in product and measurement are readily produced depending on the state of casts and the state of plating application in the individual samples, it is possible to eliminate these errors as much as possible and accurately specify the nickel-leaching source in the leaching test using samples making it possible to allow the rated surfaces to be constant. Two pieces of each test piece were prepared, and the total area to be in water-contact was set to be 5000 $mm^2$. This value exceeds the total water-contact area of about 3000 $mm^2$ of the spouts of the mixing faucets (regions A1 to A3 in FIG. 9).

(3) Test Method:

Based on the part test prescribed under JIS S3200-7, the test piece was immersed in a leaching liquid for 16 hours (without conditioning) and the leaching liquid was analyzed with an ICP (Inductively Coupled Plasma) spectrometry. The amount of the leaching liquid was set to be about 160 ml, pursuant to the inside volume of the mixing faucet (about 155 ml).

Figure 17:
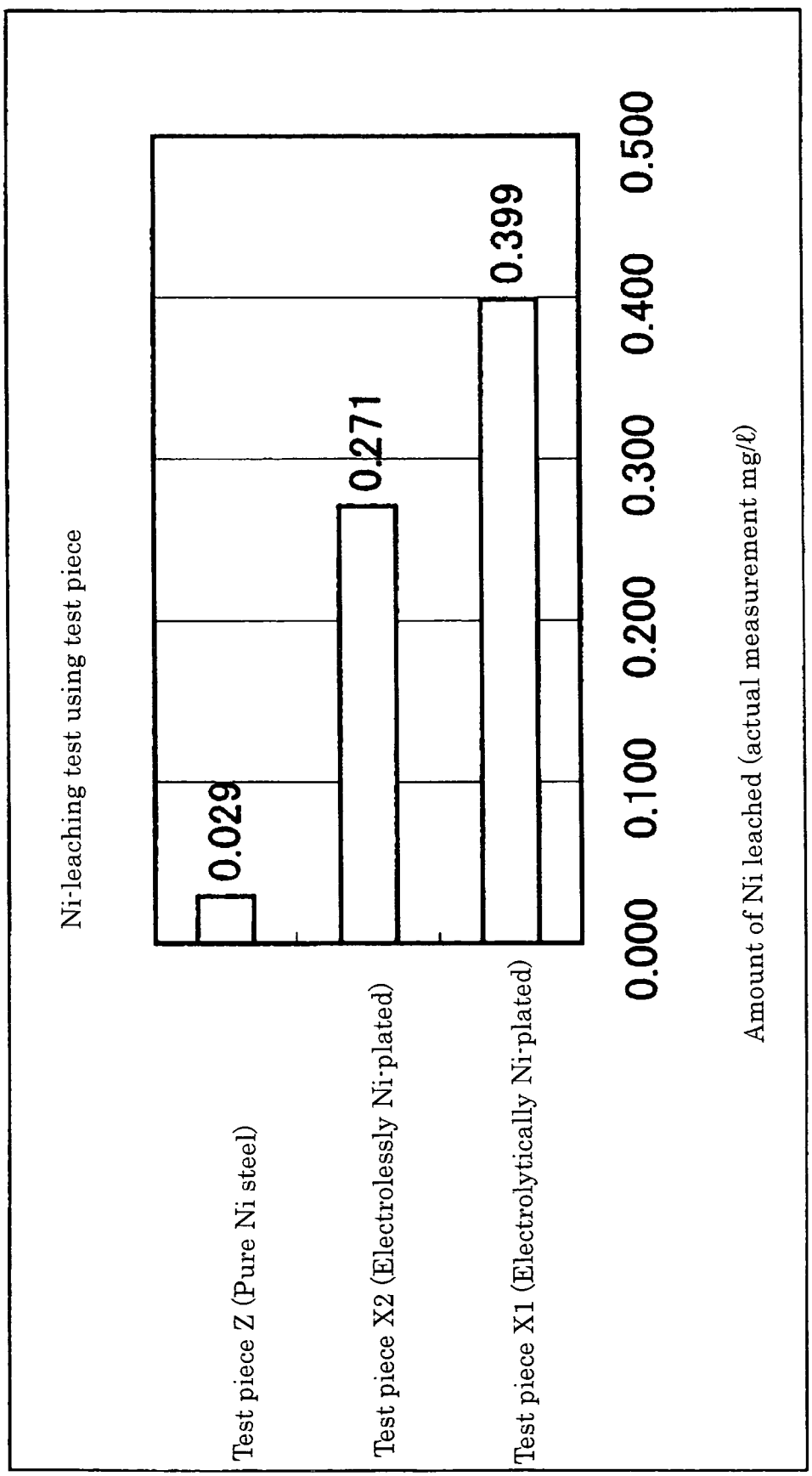
FIG. 17 is a graph showing the results of a nickel-leaching test.

(4) Test Results:

The test results are shown in FIG. 17. As was clear from the test results, it was found that leaching of nickel from the spout of the water feeder was based on direct leaching from the metallic nickel in the region of the coat or on the bimetallic corrosion due to the potential differential and that the amount of nickel leached based on the latter was larger than that based on the former.

The prescription under JIS S3200-7 (revised in 2000) will be described here. This prescription prescribes the method of testing the leaching performance of valves, such as water faucets etc., or city water instruments, such as pipes, pipe joints, etc. and the offset of the analysis results. This leaching test comprises filling the interior of a city water instrument as a sample with a leaching liquid adjusted beforehand to a liquid containing prescribed components, sealing the interior, leaving the leaching liquid as a sample liquid standing for 16 hours and then analyzing components contained in the resultant leaching liquid.

In the city water instrument subjected to the leaching test, the interior thereof before being filled with the leaching liquid is subjected to pretreatments including cleaning with city water and water prescribed under JIS K0050 and, when necessary, conditioning that is a treatment comprising repeating cleaning with the leaching liquid and leaving to stand. These pretreatments are prescribed for every one kind of city water instrument to be subjected to the leaching test, specifically, an end water feeder (a water faucet, for example) or a water feeder provided midway in a service pipe or plumbing (a valve, for example). Of the pretreatments, conditioning may be omitted if the sample liquid clearly satisfies the standards without conducting the conditioning. In the examples to be described later, the conditioning was omitted and, on the basis of this prescription, the sample liquid was analyzed using a valve etc. treated by washing with water three times.

The analysis result of a sample liquid (amount of each component leached) was rated through offset-calculation to be rated with water to be drunk (155 ml in the water faucet in this example). In a valve that is a water feeder provided midway in a plumbing, an offset is obtained by dividing the amount actually leached by 25 based on the prescription.

Example 1

Figure 18:
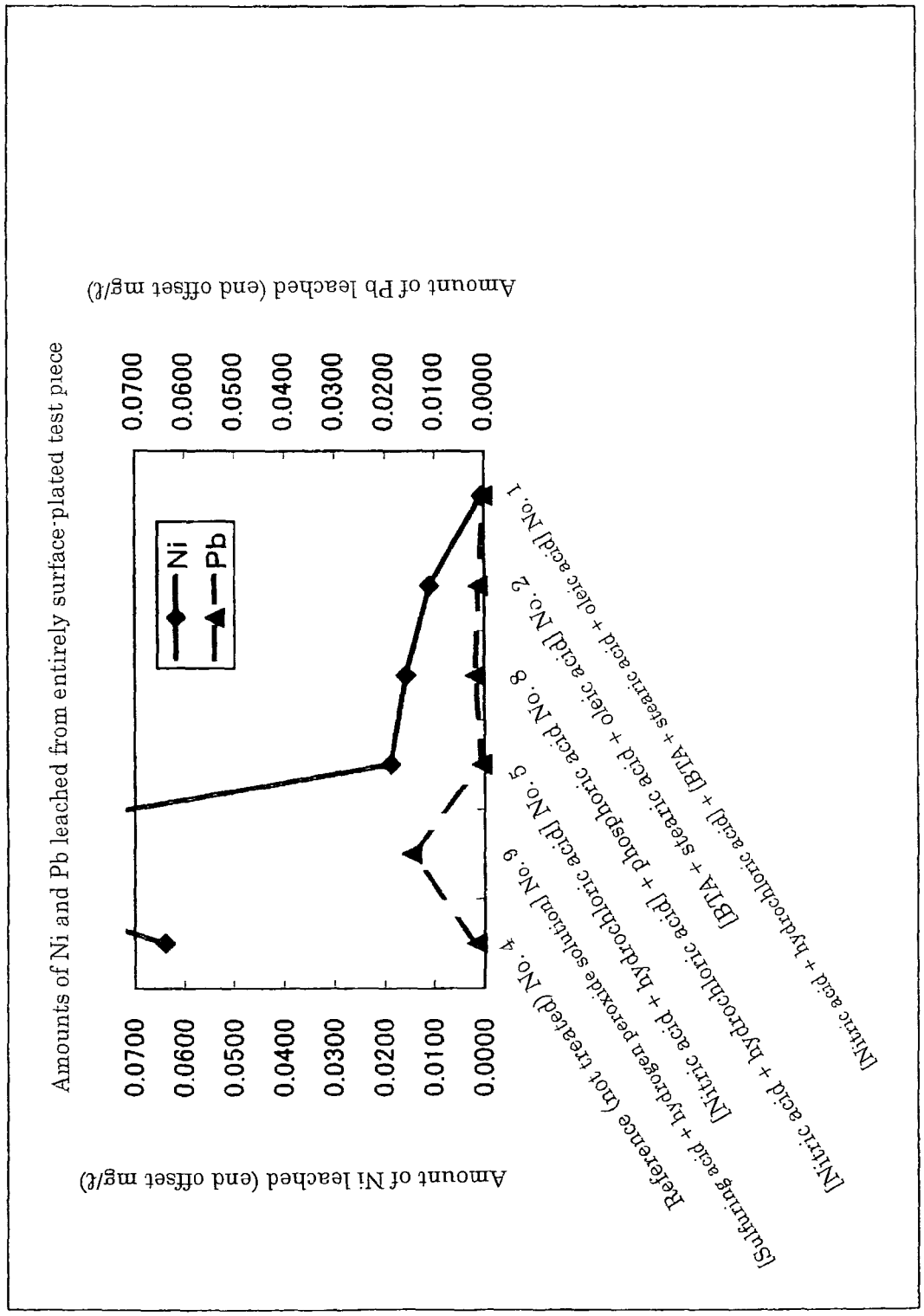
FIG. 18 is a graph showing the results of a leaching test of Ni and Pb shown in Table 6.

Examples to which the nickel-leaching prevention method of the present invention is applied will be described in detail along with comparative examples. Plate members each having a base metal material of CAC 406 and nickel-plated were used. Test pieces (having the entire surface plated and a water-contact area of about 5000 mm$^2$) subjected to three kinds of plating methods, i.e. electrolytic nickel plating (coat thickness of 2 to 3 μm), electrolytic nickel-chromium plating (Ni coat thickness of 10 μm and Cr coat thickness of 1 μm) and electroless nickel plating (Ni coat thickness of 10 μm) were prepared. A water-contact surface formation method and test method for each test piece were the same as in the "tests for specifying a source of nickel leached from the spout." The test results are shown in Table 6 and graphed in FIG. 18.

TABLE 6

|  | Sample No. | Plating Method | Treating method | Amount of Ni leached mg/ml | | | Amount of Pb leached mg/ml | | |
| --- | --- | --- | --- | --- | --- | --- | --- | --- | --- |
|  |  |  |  | Actual measurement (a) | Midway plumbing Offset (a)/25 | End offset (a)*160/1000 | Actual measurement (b) | Midway plumbing offset (b)/25 | End offset (b)*160/1000 |
| Present Invention | 1 | Electrolytic Ni plating Ni: 2 to 3 μm | Surface treatment: mixed acid [n-acid(0.5 wt %) + h-acid (0.4 wt %)]; Protective film formation: [BTA (0.5 wt %) + st-acid + small amount of o-acid] | 0.005 | 0.0002 | 0.0007 | 0.001 | 0.0001 | 0.0002 |
|  | 2 |  | Protective film formation: [BTA (0.5 wt %) + st-acid + small amount of o-acid] | 0.069 | 0.0027 | 0.0110 | 0.008 | 0.0003 | 0.0013 |
|  | 3 | Electrolytic Ni—Cr plating Ni: 10 μm Cr: 0.1 μm | Surface treatment: mixed acid [n-acid (0.5 wt %) + h-acid (0.4 wt %)]; Protective film formation: [BTA (0.5 wt %) + st-acid + small amount of o-acid] | 0.001 | 0.0000 | 0.0001 | 0.009 | 0.0003 | 0.0014 |
| Com. Ex. | 4 | Electrolytic Ni plating Ni: 2 to 3 μm | Reference (untreated) | 0.399 | 0.0160 | 0.0638 | 0.010 | 0.0004 | 0.0016 |
|  | 5 |  | Surface treatment: mixed acid [n-acid (4 wt %) + h-acid (0.4 wt %)] | 0.118 | 0.0047 | 0.0189 | 0.004 | 0.0002 | 0.0006 |
|  | 6 |  | Protective film formation: p-acid (0.9 wt %) | 0.501 | 0.0201 | 0.0802 | 0.007 | 0.0003 | 0.0011 |
|  | 7 |  | Protective film formation: p-acid (0.9 wt %); Drying at 100° C. for 10 min | 0.471 | 0.0188 | 0.0753 | 0.007 | 0.0003 | 0.0012 |
|  | 8 |  | Surface treatment: mixed acid [n-acid (4 wt %) + h-acid (0.4 wt %)]; Protective film formation: p-acid (0.9 wt %) | 0.099 | 0.0039 | 0.0158 | 0.012 | 0.0005 | 0.0019 |
|  | 9 |  | Surface treatment: [su-acid (200 g/l) + hydrogen peroxide solution (20 g/l)] | 0.773 | 0.0309 | 0.1237 | 0.092 | 0.0037 | 0.0147 |
|  | 10 | Electroless Ni plating Ni: 10 μm | Reference (untreated) | 0.271 | 0.0108 | 0.0433 | 0.020 | 0.0008 | 0.0032 | n-acid: nitric acid; h-acid: hydrochloric acid; BTA: benzotriazole; st-acid: stearic acid; o-acid: oleic acid; p-acid: phosphoric acid; su-acid: sulfuric acid every one water feeder based on this prescription. In a hot-water mixing faucet that is an end water feeder, in an instrument to be rated having an inside volume of a part in contact with drinking water that is 1 l or less, an offset is obtained by dividing the amount actually leached by 1 l and multiplying the resultant value by the volume of contact of the instrument The amount of nickel leached from sample Nos. 1 and 3 having undergone the acid cleaning treatment and the protective film formation treatment with benzotriazole+stearic acid+oleic acid were 0.0007 mg/l and 0.0001 mg/l (offsets at the ends in the water feeders), respectively, and satisfied the leaching standard of 0.001 mg/l at the end in a water feeder.

Also, the amount of nickel leached from sample No. 2 having undergone the same protective film formation treatment alone was 0.0027 mg/l (an offset midway in the plumbing in the water feeder) and satisfied the leaching standard of 0.01 mg/l midway in the plumbing in a water feeder. Therefore, by performing the surface treatment with the mixed acid of nitric acid+hydrochloric acid before the protective film formation treatment, it was confirmed that the adhesion of the protective film could be made firm and that the nickel-leaching standard of 0.001 mg/l at the end of a water feeder could be satisfied.

On the other hand, in the comparative examples, sample No. 9 having undergone the surface treatment alone with sulfuric acid+hydrogen peroxide solution, and sample Nos. 6 and 7 having undergone the surface treatment alone with phosphoric acid could not satisfy the nickel-leaching standards, and the amounts of nickel leached were rather increased. Incidentally, sample Nos. 5 and 8 having undergone the surface treatment with the mixed acid of nitric acid+hydrochloric acid satisfied the leaching standard midway in the plumbing in a water feeder.

Since the samples were test pieces having lead difficult to segregate on the alloy surfaces, the amount of lead leached from even the samples belonging to the comparative examples (exclusive of sample No. 9) satisfied the lead-leaching standard of 0.01 mg/l. By subjecting these samples to the treatment according to the present invention, the amount of the lead leached could continuously be suppressed. In sample No. 1, it was made possible to further reduce the amount of the lead leached. Incidentally, in sample Nos. 2, 6 and 7 having undergone the protective film formation treatment, the amount of the lead leached was not so reduced to a great extent. It could be inferred from this fact that a protective film was not deposited on the lead surface. In sample No. 9, the amount of the lead leached was rather increased.

Example 2

Figure 19:
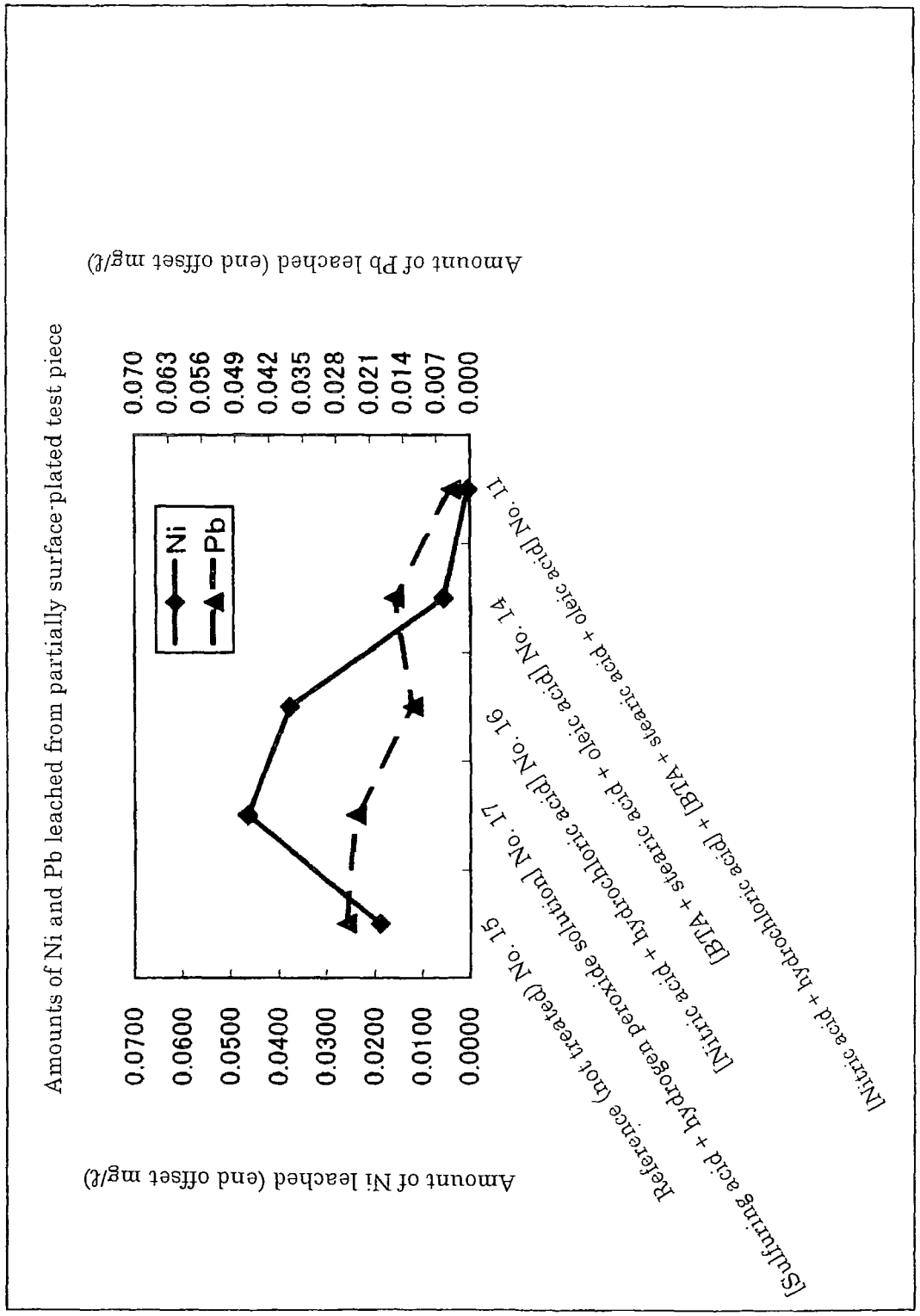
FIG. 19 is a graph showing the results of a leaching test of Ni and Pb shown in Table 7.

Each of plate members having a base material of CAC 406 was subjected to hydrolytic nickel plating (coat thickness: 2 to 3 μm), then masked in the same manner as in the samples in Table 6 and deprived of the coat over a width "a" as shown in FIG. 16(b). Test pieces each having the base metal material water-contact at the deprived section were prepared. Two pieces of each test piece were prepared, and the ratio of the coat surface was set to occupy about one half the total water-contact surface area (about 5000 $mm^2$) (partially plating application sample: coat water-contact area of about 2500 $mm^2$). The test method was the same as the "test for specifying the source of nickel leached from the spout." The test results are shown in Table 7 and graphed in FIG. 19

TABLE 7

| | Sample No. | Plating method | Treating method | Amount of Ni leached mg/ml | | | Amount of Pb leached mg/ml | | |
|---|---|---|---|---|---|---|---|---|---|
| | | | | Actual measurement (a) | Plumbing midway offset (a)/25 | End offset (a)*160/1000 | Actual measurement (b) | Plumbing midway offset (b)/25 | End offset (b)*160/1000 |
| Present Invention | 11 | Electrolytic Ni plating Ni: 2 to 3 μm | Surface treatment: mixed acid [n-acid (4 wt %) + h-acid (0.4 wt %)]; Protective film formation: [BTA (0.5 wt %) + st-acid + small amount of o-acid] | 0.003 | 0.0001 | 0.0005 | 0.023 | 0.001 | 0.004 |
| | 12 | | | 0.005 | 0.0002 | 0.0008 | 0.011 | 0.000 | 0.002 |
| | 13 | | Surface treatment: mixed acid [n-acid (4 wt %) + h-acid (0.4 wt %)]; Protective film formation: BTA (1 wt %) | 0.006 | 0.0002 | 0.0010 | 0.053 | 0.002 | 0.008 |
| | 14 | | Protective film formation: [BTA (0.5 wt %) + st-acid + small amount of o-acid] | 0.035 | 0.0014 | 0.0056 | 0.103 | 0.004 | 0.016 |
| Comp. Ex. | 15 | Electrolytic Ni plating Ni: 2 to 3 μm | Reference (untreated) | 0.118 | 0.0047 | 0.0189 | 0.161 | 0.006 | 0.026 |
| | 16 | | Surface treatment: mixed acid [n-acid (4 wt %) + h-acid (0.4 wt %)] | 0.236 | 0.0094 | 0.0378 | 0.072 | 0.003 | 0.012 |
| | 17 | | Surface treatment: [su-acid (200 g/l) + hydrogen peroxide solution (20 g/l)] | 0.291 | 0.0116 | 0.0466 | 0.148 | 0.006 | 0.024 | n-acid: nitric acid; h-acid: hydrochloric acid; BTA: benzotriazole; st-acid: stearic acid; o-acid: oleic acid; su-acid: sulfuric acid The amount of nickel leached from sample Nos. 11 and 12 having undergone the acid cleaning treatment and the protective film formation treatment with benzotriazole+stearic acid+oleic acid and from sample No. 13 having undergone the protective film formation treatment with benzotriazole were in the range of from 0.0005 mg/l to 0.0010 mg/l (offsets at the ends in the water feeders) and satisfied the leaching standard of 0.001 mg/l at the end in a water feeder. Also, the amount of nickel leached from sample No. 14 having undergone the protective film formation treatment alone with benzotriazole+stearic acid+oleic acid was 0.0014 mg/l (an offset midway in the plumbing in the water feeder) and satisfied the leaching standard of 0.01 mg/l midway in the plumbing in a water feeder. Therefore, by performing the surface treatment with the mixed acid of nitric acid+hydrochloric acid before the protective film formation treatment, it was confirmed that the adhesion of the protective film could be made firm and that the nickel-leaching standard of 0.001 mg/l at the end of a water feeder could be satisfied.

On the other hand, in the comparative examples, sample No. 17 having undergone the surface treatment alone with sulfuric acid+hydrogen peroxide solution could not satisfy the nickel-leaching standards. Incidentally, sample No. 16 having undergone the surface treatment with the mixed acid of nitric acid+hydrochloric acid satisfied the leaching standard midway in the plumbing in a water feeder.

Since the test pieces having the base metal water-contact were used as the samples, there was no sample that belongs to the comparative examples satisfying the lead-leaching standard of 0.007 mg/l. It was confirmed, however, that the samples belonging to the comparative examples when having undergone the treatments of the present invention satisfied the above standard.

Example 3

Plate members of pure nickel steel (purity: 99.98%) were prepared as test pieces (pure nickel steel having a water-contact area of about 5000 mm$^2$. The water-contact surface-forming method and test method were the same as the "test for specifying the source of nickel leached from the spout." The test results are shown in

TABLE 9

| Test piece | Weight before treatment with mixed acid (mg) | Weight after treatment With mixed acid (mg) |
|---|---|---|
| 1 | 144.3 | 144.3 |
| 2 | 134.3 | 134.3 |
| 3 | 143.0 | 143.0 |

As was clear from the table, no change in weight of the test pieces was found before and after the acid-cleaning treatment. Thus, it could be confirmed that the mixed acid solution did not corrode the nickel. Whit it is conceivable to increase the concentration of the mixed acid and add other acid components in order to enable the mixed acid treatment alone to satisfy the leaching standard for nickel from the end instrument, when a water faucet is actually immersed in such a treatment solution, the coat on the outside surface as well as nickel on the inside surface thereof will possibly separate or exfoliate. According to the treatment of the present invention,

TABLE 8

| | Sample No. | Plating method | Treating method | Amount of Ni leached mg/l | | |
|---|---|---|---|---|---|---|
| | | | | Actual Measurement (a) | Plumbing Midway Offset (a)/25 | End offset (a)*(160/1000) |
| Comp. Ex. | 18 | Pure nickel steel (purity: 99.8%) | Reference (untreated) | 0.029 | 0.0012 | 0.0046 |
| | 19 | | Surface treatment: mixed acid [nitric acid (4 wt %) + hydrochloric acid (0.4 wt %)] | 0.365 | 0.0146 | 0.0584 |
| | 20 | | Protective film formation: [BTA (0.5 wt %) + stearic acid + small amount of oleic acid | 0.020 | 0.0008 | 0.0032 |
| | 21 | | Protective film formation: BTA (1 wt %) | 0.021 | 0.0008 | 0.0034 |
| | 22 | | Surface treatment: mixed acid [nitric acid (4 wt %) + hydrochloric acid (0.4 wt %)] Protective film formation: [BTA (0.5 wt %) + stearic acid + small amount of oleic acid | 0.010 | 0.0004 | 0.0016 |

While sample Nos. 20 to 22 satisfied the leaching standard midway in the plumbing of a water feeder that was 0.01 mg/l, they could not satisfy the leaching standard at the end of a water feeder that was 0.001 mg/l. Also, as shown in the table, the amount of Ni leached from sample No. 19 having encountered the surface treatment with the mixed acid of nitric acid+hydrochloric acid exceeded that from sample No. 18 (reference). This was caused by the fact that the nickel surface was activated with the acid to render the nickel to be easy to bond to the water molecules rather than the fact that the nickel (so-called metallic nickel) was dissolved with the acid. However, this does not mean that the acid corrodes the nickel surface. The following test was conducted to exemplify it.

In this test, three square plate members of pure nickel steel (5 mm×5 mm×0.8 mm) were prepared as test pieces. A degreasing agent (organic solvent) was used to degrease the surfaces of the test pieces and then a precision electronic scale (measurable up to a unit of 0.1 mg) was used to the weights thereof. Subsequently, the test pieces were immersed for 10 min in a mixed acid solution comprising 4 wt % of nitric acid+0.4 wt % of hydrochloric acid, then dried and weighed with the precision electronic scale to confirm the change the weights of the test pieces before and after the treatment with the mixed acid. The measurement results are shown in Table 9.

it is made possible to suppress the elution of nickel or lead on the inside surface to a level satisfying the prescribed leaching standards without adversely affecting the coat on the outside surface while using the immersing treatment exhibiting good productivity.

Example 4

Next, examples in which the nickel elution prevention method of the present invention is applied to actual products of ball valves will be described in detail together with a comparative example. 10K ball valves (made of C3771) having a nominal diameter of ½B, an inside volume of 25 ml and a water-contact area, including the inner surface of the valve body and the surface of the ball valve body as the entire inner surface area, of 3440 mm$^2$ were used as samples. Each sample was plated with nickel-chromium alloy and subjected to acid-cleaning treatment as the nickel-removing step. The acid-cleaning treatment used a mixed acid of 4 wt % of nitric acid+0.4 wt % of hydrochloric acid and adopted an immersion treatment of the entire sample at a temperature of 25° C. for a period of 10 min to remove nickel and lead as well. In the protective film formation step after the acid-cleaning treatment, a protective film was formed over the entire inside surface of each sample. The treatment conditions adopted a mixture of 0.5 wt % of benzotriazole+stearic acid+a small amount of oleic acid and the immersion treatment of the entire sample at a treatment temperature of 50° C. for a treatment period of 5 min. A leaching test was performed without use of conditioning with respect to a water feeder (ball valve) installed midway in the plumbing in accordance with the prescription of JIS S3200-7 "Leaching Test Method in City Water Instrument." The test results are shown in Table 10.

Example 5

An example in which the nickel elution prevention method of the present invention is applied to an actual product of water faucet will next be described in detail together with a comparative example. The commercially available single lever-type mixing faucet (made of CAC 406, refer to FIG. 9)

TABLE 10

| | Sample No. | Plating method | Treating method | Amount of Ni leached mg/l | | Amount of Pb leached mg/l | |
|---|---|---|---|---|---|---|---|
| | | | | Actual measurement (a) | Plumbing midway offset (a)/25 | Actual measurement (b) | Plumbing midway offset (b)/25 |
| Present Invention | 23 | Electrolytic nickel-chromium plating | Surface treatment: mixed acid [nitric acid (4 wt %) + hydrochloric acid (0.4 wt %)] Protective film formation: [BTA (0.5 wt %) + stearic acid + small amount of oleic acid | 0.201 | 0.008 | 0.001 | 0.000 |
| | 24 | | | 0.067 | 0.003 | 0.055 | 0.002 |
| | 25 | | Surface treatment: mixed acid [nitric acid (4 wt %) + hydrochloric acid (0.4 wt %)] Protective film formation: [BTA (1 wt %) + stearic acid + small amount of oleic acid | 0.012 | 0.000 | 0.025 | 0.001 |
| | 26 | | Protective film formation: BTA (1 wt %) | 0.20 | 0.008 | 0.100 | 0.004 |
| Comp. Ex. | 27 | Electrolytic nickel-chromium plating | Reference (untreated) | 0.400 | 0.016 | 0.150 | 0.006 |

While the amount of nickel leached from sample No. 27 that was a reference (untreated) was 0.016 mg/l (offset), the amounts of nickel leached from sample Nos. 23 to 25 having undergone the acid-cleaning treatment and the protective film formation treatment with benzotriazole+stearic acid+a small amount of oleic acid and from sample No. 26 having undergone the protective film formation treatment alone with benzotriazole were in the range of 0.000 to 0.008 mg/l (offset) that satisfied the leaching standard of 0.01 mg/l midway in the plumbing of a water feeder.

Though the amount of nickel leached from sample No. 27 that was a reference (untreated) was 0.016 mg/l (offset) that also satisfied the leaching standard of 0.01 mg/l midway in the plumbing of a water feeder, in sample Nos. 23 to 25 having undergone the acid-cleaning treatment and the protective film formation treatment with benzotriazole+stearic acid+a small amount of oleic acid and sample No. 26 having undergone the protective film formation treatment alone with benzotriazole, the amounts of lead leached were also reduced.

having an inner volume of about 155 ml, and a water-contact area of about 3000 mm² as an inner surface area of the sections around which the nickel wrapped (regions A1 to A3 in FIG. 9) was used as a sample. After the nickel-plating treatment, the acid-cleaning treatment was performed as the nickel-removing step. The acid-cleaning treatment was an immersion treatment of the entire sample in a mixture of 4 wt % of nitric acid and 0.4 wt % of hydrochloric acid at a temperature of 25° C. for 10 min to remove nickel and lead as well. In the protective film formation step after the acid-cleaning treatment, a protective film was formed over the entire inner surface of the sample. This step was an immersion treatment of the entire sample in a mixture of 0.5 wt % of benzotriazole+stearic acid+a small amount of oleic acid at 50° C. for 5 min. A leaching test was conducted without performing conditioning in accordance with the prescription of JIS 3200-7 "Leaching Performance Test Method for City Water Instrument" to measure the leaching amount at the end of a water feeder. The measurement results (single lever-type mixing faucet) are shown in Table 11.

TABLE 11

| | Sample No. | Plating method | Treatment method | Amount of Ni leached mg/l | | Amount of Pb leached mg/l | |
|---|---|---|---|---|---|---|---|
| | | | | Actual measurement (a) | End offset (a)*(156/1000) | Actual measurement (b) | End offset (b)*(156/1000) |
| Present invention | 28 | Electrolytic nickel-chromium plating | Surface treatment: mixed acid [nitric acid (4 wt %) + hydrochloric acid (0.4 wt %)] Protective film formation: [BTA (1 wt %) + stearic acid + small amount of oleic acid] | 0.006 | 0.0009 | 0.019 | 0.0029 |
| Comp. Ex. | 29 | Electrolytic nickel-chromium plating | Reference (untreated) | 0.065 | 0.0101 | 0.225 | 0.0349 |

While the amount of nickel leached from sample No. 29 that was a reference (untreated) was 0.101 mg/l, (offset), the amount of nickel leached from sample No. 28 having undergone the acid-cleaning treatment and the protective film formation treatment with benzotriazole+stearic acid+a small amount of oleic acid was 0.0009 mg/l (offset) that satisfied the leaching standard of 0.001 mg/l, at the end of a water feeder.

The amount of lead leached from sample No. 29 that was a reference (untreated) was 0.0349 mg/l (offset), whereas the amount of lead leached from sample No. 28 having undergone the acid-cleaning treatment and the protective film formation treatment with benzotriazole+stearic acid+a small amount of oleic acid was 0.0029 mg/l (offset) that satisfied the leaching standard of 0.007 mg/l at the end of a water feeder. According to the nickel elution prevention method of the present invention, therefore, it was confirmed that both the nickel-leaching standard and the lead-leaching standard could be satisfied.

Figure 20:
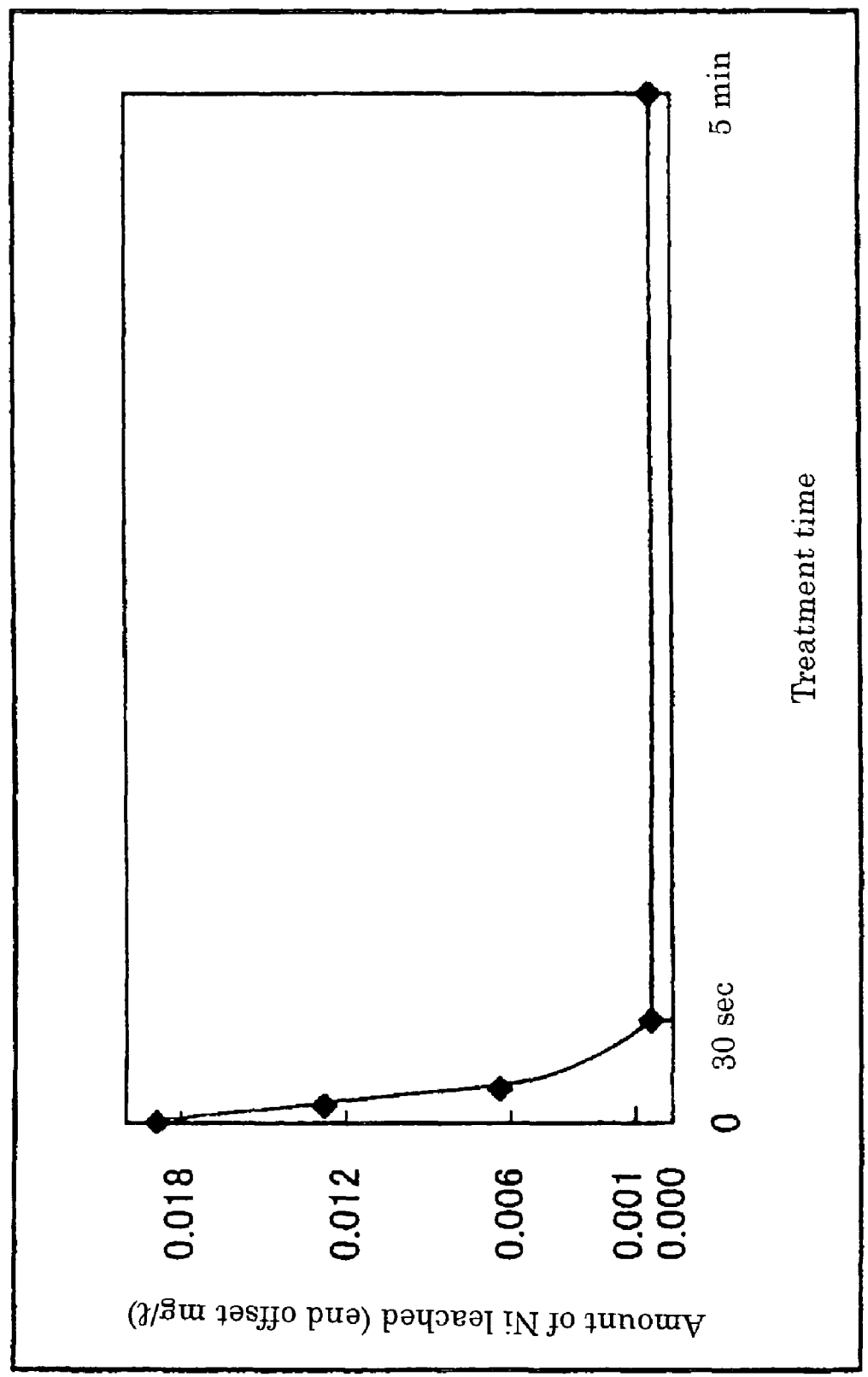
FIG. 20 is a graph showing the results of verifying the treatment time necessary for the formation of a protective film satisfying a nickel-leaching amount of 0.001 mg/l.

In view of the fact that the actual products in Examples 4 and 5 had a complicated structure and did not have a smooth surface, the treating time for forming the protective film was set to be 5 min. It was decided to verify the treatment time necessary for the formation of a protective film capable of satisfying the nickel-leaching amount of 0.001 mg/l using the test piece X1 of Example 1 having the plate member whose base metal material was CAC 406 subjected to electrolytic nickel plating (nickel coat thickness of 2 to 3 μm). Consequently, the results shown in Table 13 and FIG. 20 were obtained. It was found from the results that the immersion for 30-minutes or more enabled the formation of a good protective film.

TABLE 12

| | | Amount of Ni leached mg/l | | |
|---|---|---|---|---|
| Treating method | Protective film formation time | Actual measurement (a) | Plumbing midway offset (a)/25 | End offset (a)*(160/1000) |
| Surface treatment: | | | | |
| nitric acid (4 wt %) + sulfuric acid (0.4 wt %) | 0 sec | 0.118 | 0.0047 | 0.0189 |
| | 5 sec | 0.080 | 0.0032 | 0.0128 |
| | 10 sec | 0.040 | 0.0016 | 0.0064 |
| | 30 sec | 0.005 | 0.0002 | 0.0008 |
| Protective film formation: BTA (0.5 wt % + stearid acid and a small amount of oleic acid | 5 min | 0.005 | 0.0002 | 0.0008 |

Figure 21:
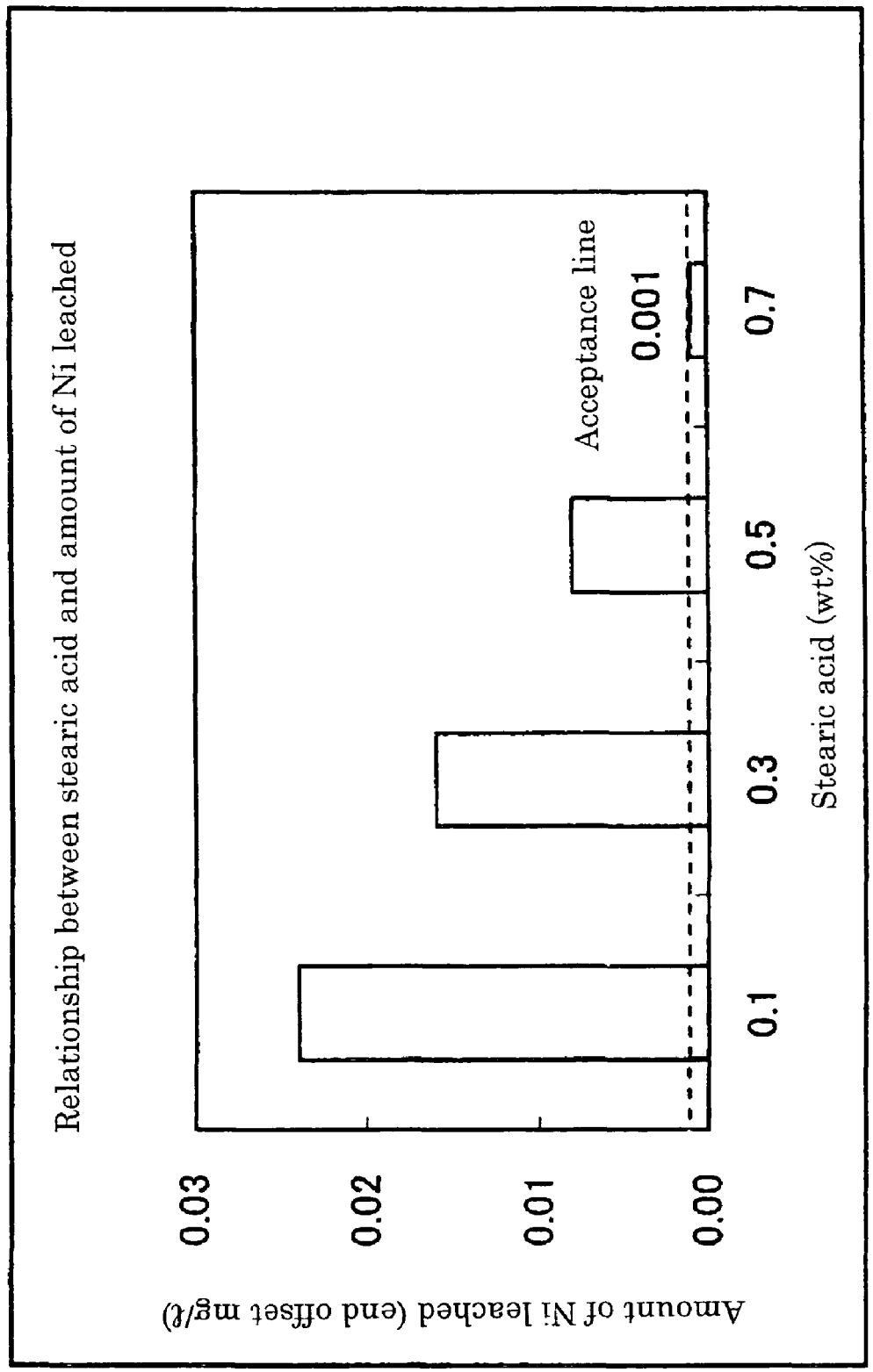
FIG. 21 is a graph showing the results of verifying the effective concentration of a stearic acid.
Figure 22:
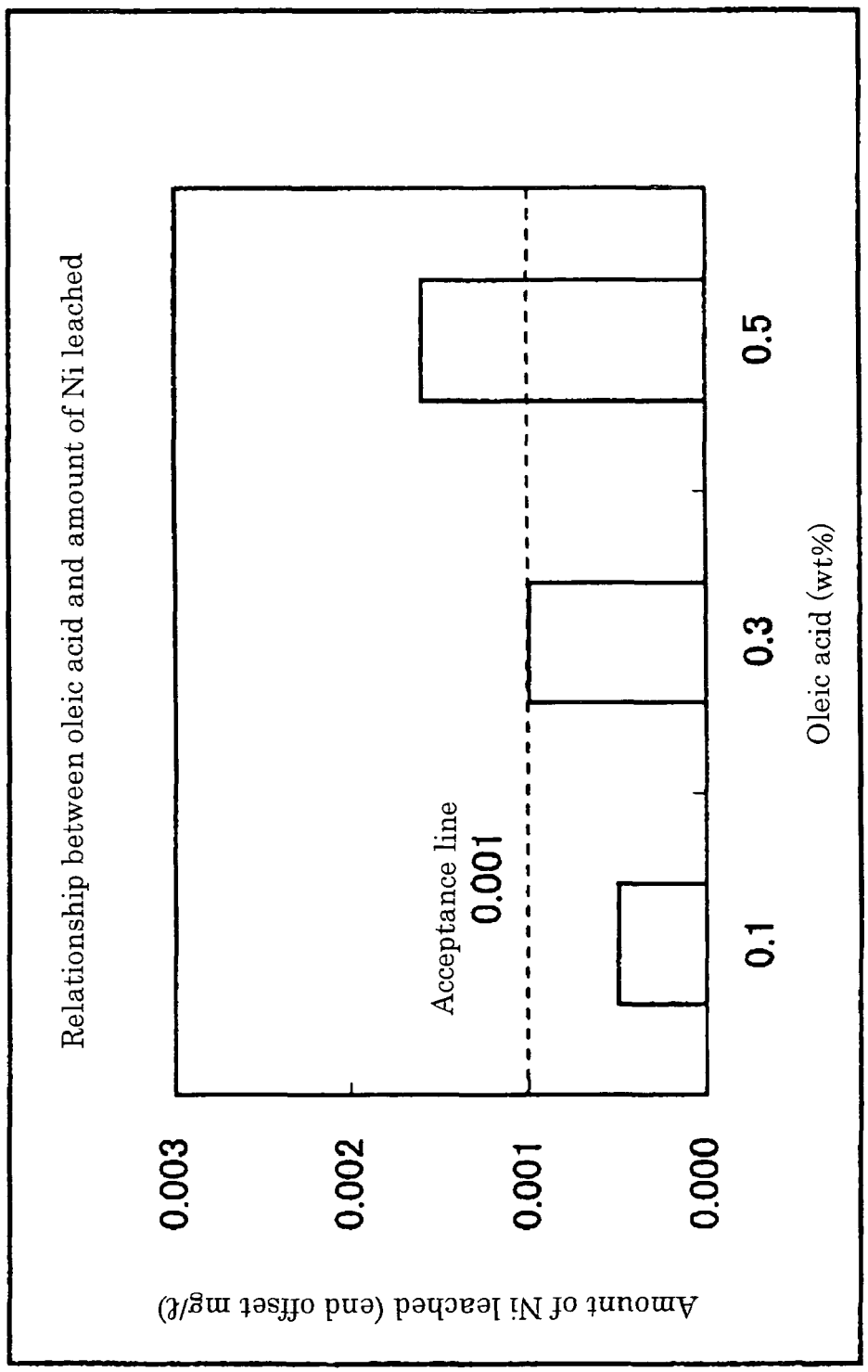
FIG. 22 is a graph showing the results of verifying the effective concentration of an oleic acid.
Figure 23:
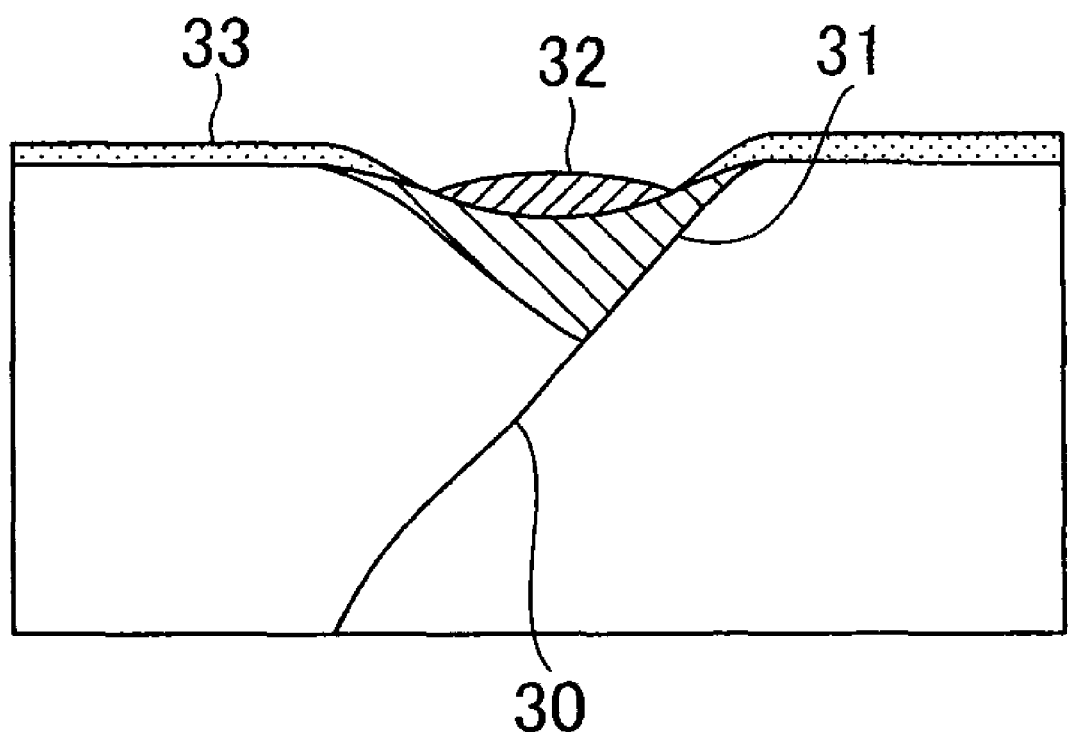
FIG. 23 is an explanatory view showing the state at the crystal grain boundary of the inner surface of a water-contact instrument subjected to the conventional lead elution prevention treatment.

Further, here, the effective concentrations of the stearic acid and oleic acid that were the protective film formation components were verified. The test piece X1 of Example 1 having the plate member whose base metal material was CAC 406 subjected to electrolytic nickel plating (nickel coat thickness of 2 to 3 μm) was used as the sample. The test results are shown in Table 13 and FIGS. 21 and 22. Furthermore, for the purpose of confirming an actual product, the ball valve of Example 4 was used as the sample. The test results are shown in Table 14.

TABLE 13

| Plating method | Treating method | Amount of nickel leached mg/l ||| Amount of Pb leached mg/l |||
|---|---|---|---|---|---|---|---|
| | | Actual measurement (a) | Plumbing Midway Offset (a)/25 | End offset (a)*(169/1000) | Actual measurement (b) | Plumbing Midway Offset (b)/25 | End offset (b)*(169/1000) |
| Electrolytic nickel plating Ni = 2 to 3 μm | Surface treatment: mixed Acid [nitric acid (4 wt %) + hydrochloric acid (0.4 wt %)] Protective film formation: [BTA (0.5 wt %) + stearic acid (0.1 wt %)] | 0.15 | 0.0060 | 0.024 | 0.024 | 0.001 | 0.0038 |
| | Surface treatment: mixed Acid [nitric acid (4 wt %) + hydrochloric acid (0.4 wt %)] Protective film formation: [BTA (0.5 wt %) + stearic acid (0.3 wt %)] | 0.10 | 0.0040 | 0.016 | 0.023 | 0.001 | 0.0037 |
| | Surface treatment: mixed Acid [nitric acid (4 wt %) + hydrochloric acid (0.4 wt %)] Protective film formation: [BTA (0.5 wt %) + stearic acid (0.5 wt %)] | 0.05 | 0.0020 | 0.008 | 0.024 | 0.001 | 0.0038 |
| | Surface treatment: mixed Acid [nitric acid (4 wt %) + hydrochloric acid (0.4 wt %)] Protective film formation: [BTA (0.5 wt %) + stearic acid (0.7 wt %)] | 0.006 | 0.0002 | 0.0010 | 0.025 | 0.001 | 0.0040 |
| | Surface treatment: mixed Acid [nitric acid (4 wt %) + hydrochloric acid (0.4 wt %)] Protective film formation: [BTA (0.5 wt %) + oleic acid (0.1 wt %)] | 0.003 | 0.0001 | 0.0005 | 0.023 | 0.0009 | 0.0037 |
| | Surface treatment: mixed Acid [nitric acid (4 wt %) + hydrochloric acid (0.4 wt %)] Protective film formation: [BTA (0.5 wt %) + oleic acid (0.3 wt %)] | 0.006 | 0.0002 | 0.0010 | 0.021 | 0.0009 | 0.0034 |
| | Surface treatment: mixed Acid [nitric acid (4 wt %) + hydrochloric acid (0.4 wt %)] Protective film formation: [BTA (0.5 wt %) + oleic acid (0.5 wt %)] | 0.01 | 0.0004 | 0.0016 | 0.022 | 0.0009 | 0.0035 |

TABLE 14

| Plating method | Treatment method | Amount of Ni leached mg/l |||
|---|---|---|---|---|
| | | Actual measurement (a) | Plumbing midway offset (a)/25 | End offset (a)*(160/1000) |
| Electrolytic nickel-chromium plating | Surface treatment: mixed acid [nitric acid (4 wt %) + hydrochloric acid (0.4 wt %)] Protective film formation: [BTA (0.5 wt %) + oleic acid (0.1 wt %)] | 0.004 | 0.00016 | 0.0006 |

It was found from these test results that the effects could be manifested when the content of the stearic acid was 0.7 wt % or more and when the content of the oleic acid was 0.3 wt % or less. It was exemplified that these effective contents were applicable to the actual products.

Since C3771 is at a disadvantage in that it induces corrosion by dezinfication, the copper-based alloy developed by the present applicant (JP-A HEI 7-207387) is used to enable a water-contact instrument having dezincing resistance and dezincing resistance characteristics to be provided. The copper-based alloy has a composition comprising 59.0 to 62.0% of Cu, 0.5 to 4.5% of Pb, 0.05 to 0.25% of P, 0.5 to 2.0% of Sn, 0.05 to 0.30% of Ni and the balance of Zn and unavoidable impurities (all in wt %) and is excellent in corrosion resistance and hot working. An alternative is a copper-based alloy that has a composition comprising 59.0 to 62.0% of Cu, 0.5 to 4.5% of Pb, 0.05 to 025% of P, 0.5 to 2.0% of Sn, 0.05 to 0.30% of Ni, 0.02 to 0.15% of Ti and the balance of Zn and unavoidable impurities (all in wt %) and having an α+β texture uniformly compartmentalized and is excellent in corrosion resistance and hot working.

Furthermore, use of the copper-based alloy developed by the present applicant (JP-A HEI 10-317078) enables the provision of a water-contact instrument excellent in hot working and stress corrosion cracking resistance characteristics besides the aforementioned characteristics. The copper-based alloy has a composition comprising 58.0 to 63.0% of Cu, 0.5 to 4.5% of Pb, 0.05 to 0.25% of P, 0.5 to 3.0 T of Sn, 0.05 to 0.30% of Ni and the balance of Zn and unavoidable impurities (all in wt %) and having an α+β texture uniformly compartmentalized and is excellent in corrosion resistance and hot working. This alloy, when having further undergone an appropriate drawing work and heat treatment, is enhanced in mechanical properties including tensile strength, proof stress and elongation and, when having been satisfactorily deprived of internal stress, excels in stress corrosion cracking resistance. An alternative is a copper-based alloy having a composition comprising 58.0 to 63.0% of Cu, 0.5 to 4.5% of Pb, 0.05 to 0.25% of P, 0.5 to 3.0% of Sn, 0.05 to 0.30% of Ni, 0.02 to 0115% of Ti and the balance of Zn and unavoidable impurities (all in wt %) and having an α+β texture uniformly compartmentalized to exhibit excellent corrosion resistance and excellent hot working. This alternative, when having further undergone an appropriate drawing work and heat treatment, is enhanced in mechanical properties including tensile strength, proof stress and elongation and, when having been satisfactorily deprived of internal stress, excels in stress corrosion cracking resistance. It is preferred to have a composition ratio of P and Sn satisfying P (%)×10=(2.8 to 3.98 (%))–Sn (%).

When using the copper-based alloy developed by the present applicant (JP-A 2000-319736, it is possible to provide a Pb-free copper-based alloy excellent in dezincing resistance, cutting processing property and hot forgeability. The copper-based alloy is characterized in that it contains a component that has a boiling point lower than that of a base phase comprising an α-phase, (α+β)-phase or (α+β+γ)-phase and a component enabling the base phase and low boiling-point component to be dispersed to cause uniform dispersion with a soft phase (Bi) and a hard phase (Se+Cu, Se+Zn, γ-phase), thereby enhancing the cutting processing property thereof. The brass for hot forging has a composition comprising 59.0 to 62.0% of Cu, 0.5 to 1.5% of Sn, 1.0 to 2.0% of Bi, 0.03 to 0.20% of Se, 0.05 to 0.20% of Fe and 0.05 to 0.10% of P. The brass for cutting processing is a lead-free alloy that has a composition comprising 61.0 to 63.0% of Cu, 0.3 to 0.7% of Sn, 1.5 to 2.5% of Bi, 0.03 to 0.20% of Se, 0.1 to 0.30% of Fe and 0.05 to 0.10% of P.

When using the copper-based alloy developed by the present applicant (JP-A 2003-92217), it is possible to provide a Pb-free copper-based alloy improved in debasement of toughness at high temperature and making the mechanical properties close further to those of CAC 406. The alloy contains at least 2.8 to 5.0 wt % of Sn, 0.4 to 3.0 wt % of Bi and 0<Se≦0.35 wt % to enhance the mechanical properties while securing the prescribed cutting machinability and casting soundness. To be specific, it is a lead-free copper-based alloy having a composition comprising 0.4 to 3.0 wt % of Bi, 0<Se≦0.35 wt %, 2.8 to 5.0 wt % of Sn, 5.0 to 10 wt % of Zn, 3.0 wt % or less of Ni, less than 0.5 wt % of P and less than 0.2 wt % of Pb.

When subjecting the copper-based alloys represented by the above examples and excellent in corrosion resistance, hot working and stress corrosion cracking resistance characteristics to the nickel elution prevention method of the present invention, it is made possible to provide a water-contact instrument made of copper-based alloy having a property of preventing the elution of nickel besides the aforementioned features. Furthermore, use of the lead-free copper-based alloys represented by the above examples enables the provision of copper-based alloys extremely small in the amount of lead eluted. In this case, the neutralizing step 12, deleading step 13 and water washing step 14 can be eliminated from the treatment processing for the method of preventing nickel elution shown in FIG. 8. It is made possible to provide, via the nickel-plating step 15, nickel-removing step 16 and protective film formation step 18, a water-contact instrument of copper-based alloy capable of preventing the elution of lead and nickel.

Moreover, the protective film formation composition may be dissolved in an organic solvent containing at least one species selected from the group consisting of glycol ethers, alcohols and amines to adapt the result alloy for the DMG test based on the EN 12471 standard. The glycol ethers include 3-methyl-3-methozy butanol and butyl cellosolve, for example. The alcohols include benzyl alcohol. As the amines, morphorine, monoethanolamine, triethanolamine, alcanolamines having an isoform like triisopropanylamine, amines having a cycloform like cyclohexylamine and dicyclohexylamine and long-chain alcoholamine can be raised.

The DMG test based on the EN 12471 standard comprises a pretreatment of corroding the surface of alloy with artificial sweat imitating the effect of sweat, heat treatment (50° C.) and subsequent reaction of nickel ions with dimethylglyoxym in the presence of ammonium into a red color. A cotton-tipped swab is infiltrated with these referential substances and used to wear away part of a test object and observe a change in color at that part. This test is a strict one taking into consideration the inference that anyone would directly touch the nickel-containing substance. Slight tarnish is regarded as having exceeded 0.0005 $mg/cm^2$/week. No tarnish can only be regarded as having passed the test. Test piece X1 that was the plate member whose base metal material was CAC 406 and which underwent electrolytic nickel plating over the entire surface thereof (nickel coat thickness of 2 to 3 μm was used as in Example 1, subjected to the surface treatment with a mixed acid of nitric acid (4 wt %)+hydrochloric acid (0.4 wt %) and then to nickel elution prevention treatment with the protective film formation agents shown in Table 15 and further subjected to the DMG test under the EN 12471 standard and the leaching test under JIS 3200-7. The results of the tests are shown in Table 15.

TABLE 15

| | | Protective film formation agent (wt %) | | | | | | | | | | |
|---|---|---|---|---|---|---|---|---|---|---|---|---|
| | | No. 1 | No. 2 | No. 3 | No. 4 | No. 5 | No. 6 | No. 7 | No. 8 | No. 9 | No. 10 | No. 11 |
| Protective film formation component | Benzotriazole | 0.5 | 0.5 | 0.5 | 0.5 | 0.5 | 0.5 | 0.5 | 0.5 | 0.5 | 0.5 | 0.5 |
| | Oleic acid | 0.1 | 0.1 | 0.1 | 0.1 | 0.1 | 0.1 | 0.1 | 0.1 | 0.1 | 0.1 | 0.1 |
| Solvent | 3-methyl-3-methoxybutanol | 33- | 50 | 10 | 10 | 10 | 10 | 10 | 10 | 10 | 10 | 10 |
| | Morpholine | 0.02 | 0.02 | 0.02 | 0.03 | 0.40 | — | — | — | — | — | — |
| | Monoethanolamine | — | — | — | — | — | — | — | 0.02 | 0.28 | — | — |
| | Triethanolamine | — | — | — | — | — | — | — | — | — | 0.05 | 0.67 |
| | Ethanol | 33 | — | — | — | — | — | — | — | — | — | — |
| | NaOH | — | — | — | — | — | 0.01 | 0.18 | — | — | — | — |
| | Softened water | Balance | Balance | Balance | Balance | Balance | Balance | Balance | Balance | Balance | Balance | Balance |
| Leaching test under JIS S3200-7 | | Pass | Pass | Pass | Pass | Pass | Rejection | Rejection | Pass | Pass | Pass | Pass |
| DMG test under EN12471 standard | | Rejection | Pass | Rejection | Pass | Pass | Rejection | Rejection | Pass | Pass | Pass | Pass |

While No. 1 shown in Table 15 contained 33 wt % of 3-methyl-3-methoxybutanol, 33 wt % of ethanol, etc. as solvents extremely effective for water-solubilizing the protective film formation components comprising benzotriazole and oleic acid, the result of the test was regarded as being rejectable. Since No. 2 used the solvent containing no ethanol from the standpoint of suppressing the volatilization and containing 3-methyl-3-methoxybutanol, the concentration of which was increased to 50 wt %, it passed the test. However, since it contained a large amount of solvent components, the inflammability became high and the strong chemical small was an obstacle to the protective film formation work. In view of this fact, the concentration of 3-methyl-3-methoxybutanol was fixed to be 10 wt % and other solvent components were adjusted to make attempts to improve the drawbacks.

As a result, No. 3 to No. 5 adopting the organic solvent containing 10 wt % of 3-methyl-3-methoxybutanol and 0.03 wt % or more of morpholine, No. 8 and No. 9 adopting the organic solvent containing 10 wt % of 3-methyl-3-methoxybutanol and 0.02 wt % or more of monoethanolamine and No. 10 and No. 11 adopting the organic solvent containing 10 wt % of 3-methyl-3-methoxybutanol and 0.05 wt % or more of triethanolamine, in each of which organic solvent the protective film formation components were dissolved, passed the two tests.

In spite of the fact that No. 1 and No. 10 have the same protective film formation composition, No. 1 failed to pass the DMG test. In order to verify the reason for it, the CASS test under JIS Z2371 was conducted. The corrosion mechanism lies in addition to the effects of corrosion by hydrogen ions resulting from the reduction in pH and corrosion by copper ions accompanied by copper chloride besides corrosion by salt water, such as by salt water spraying. Furthermore, the treatment temperature is set at 50° C. to heighten the corrosion speed. Also, though pure Ni steel is to be used by nature, since no discoloration (rust) is produced even on the corroded surface of the pure Ni steel, no discrimination is possible. Therefore, when pure copper was used as an alternative, almost no discernible corrosion could be found in the case of using the protective film formation agent of No. 10, whereas the film exfoliated and the entire surface was corroded in the case of using the protective film formation agent of No. 1.

Therefore, by specifying the protective film formation components and the solvents for solving the components in water, it is made possible to form a film capable of passing the DMG test under the EN 12471 standard on the nickel-plated surface while suppressing the effects of inflammability and chemical smell during the course of the protective film formation work. Thus, it is possible to prevent nickel allergosis resulting from contact with copper-based alloy plated with nickel.

Test pieces of pure Ni steel to which No. 1 and No. 10 in Table 15 was applied were analyzed with respect to the states of organic thin films using the Ultraviolet. Photoelectron Spectroscopy (UPS) and the Penning Ionization Electron Spectroscopy (PIES). The UPS and PIES analyses are means for observing an organic thin film by making the beams as small as possible and irradiating the beams in parallel to the objective workpieces.

Figure 24:
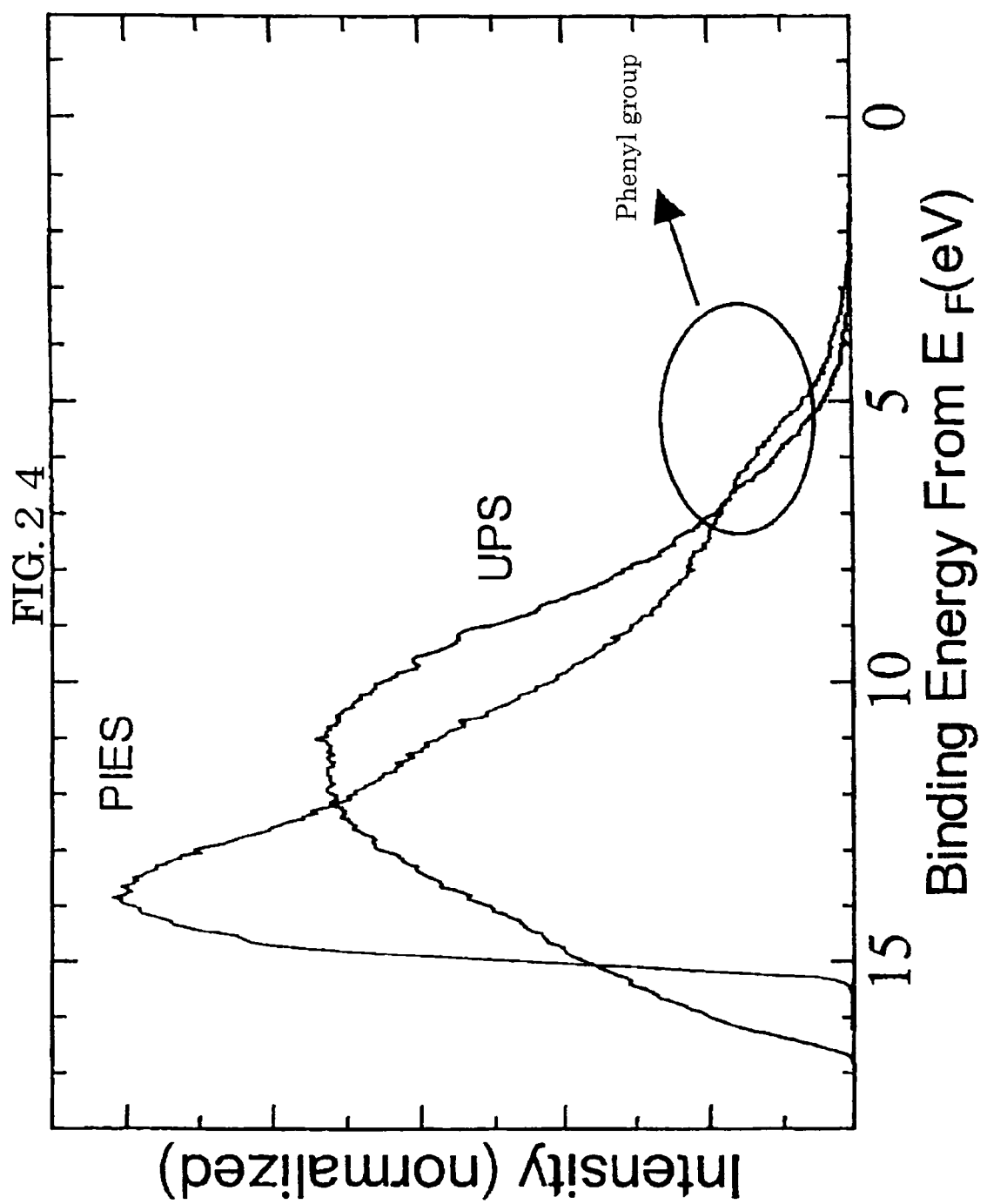
FIG. 24 is a graph showing the results of analysis by the Ultraviolet Photoelectron Spectroscopy (UPS) and Penning Ionization Electron Spectroscopy (PIES).
Figure 25:
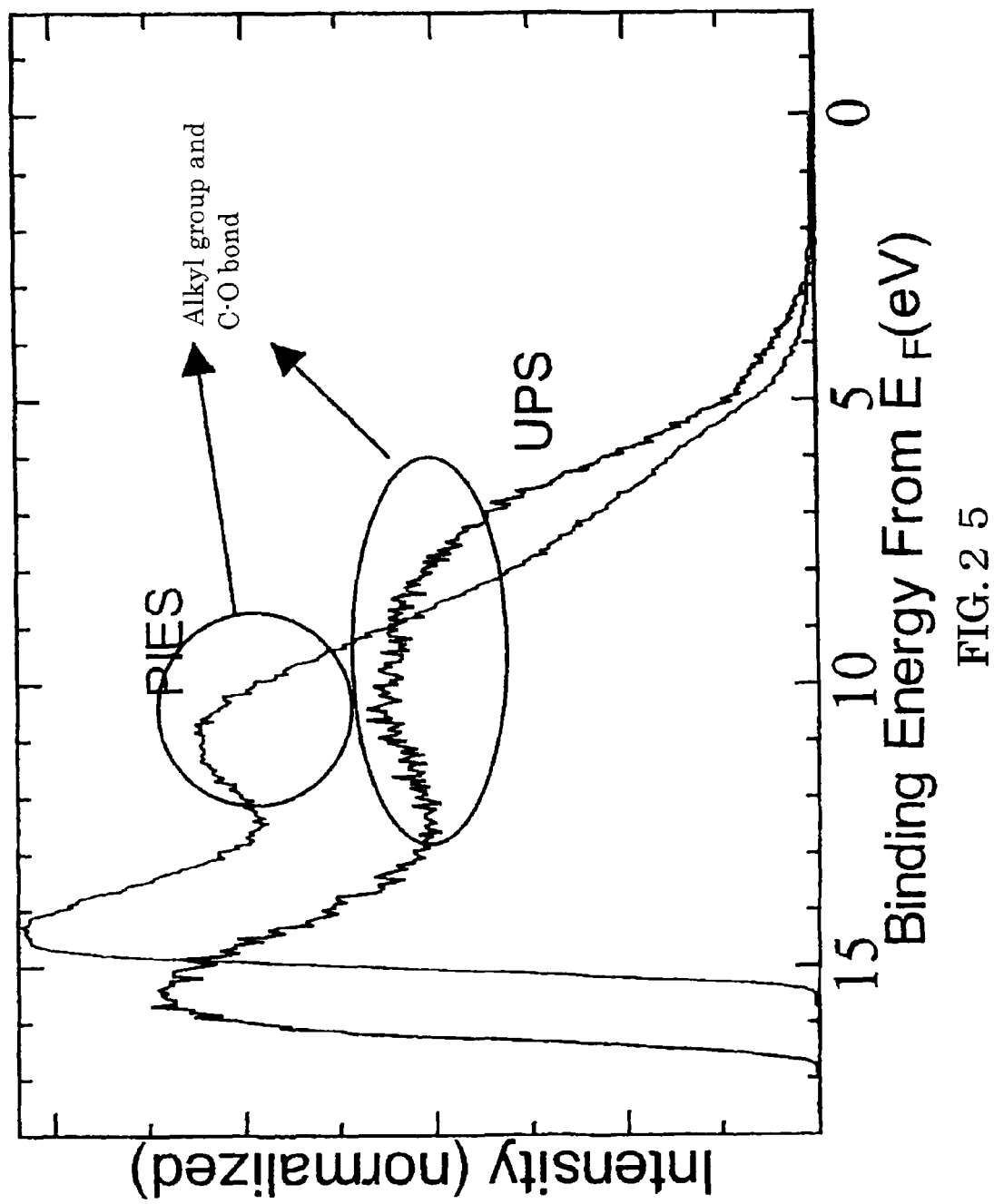
FIG. 25 is a graph showing the results of analysis by the Ultraviolet Photoelectron Spectroscopy (UPS) and Penning Ionization Electron Spectroscopy (PIES).

FIGS. 24 and 25 show the results of analyses by the Ultraviolet Photoelectron Spectroscopy (UPS) and the Penning Ionization Electron Spectroscopy (PIES). It is found from the analysis results of the protective film formation agent No. 1 shown in FIG. 24 that the peak of phenyl group exists in the benzotriazole molecule. It is conceivable in consideration of the results of the molecular crystal growth and CASS test that the crystal growth is localized and that the film structure is unhomogeneous. It is inferred that light beams in the PS and PIES collide against the protuberant benzotriazole crystal mass to seize the peak of the phenyl group.

On the other hand, from the results of the analysis of the protective film formation agent No. 10 shown in FIG. 25, the oleic acid molecules witheringly small in number seize the peaks of the existing alkyl group and C—O bond. Also in consideration of the CASS test results, it is conceivable that the film has a homogeneous structure and it is inferred that the UPS and PIES beams collide on the tall crystal flux of the oleic acid to seize the peaks of the alkyl group and C—O bond. As shown in FIG. 26($a$), the arrayed crystals of the oleic acid small in number of molecules are grown in a slender mesh shape like a grid, and the surrounded cell portions are filled regularly with benzotriazole like "go" stones on a "go" board. Moreover, as shown in FIG. 26($b$), it is conceivable that each crystal is not perpendicular to, but is inclined relative to the analyzed peak.

In the light of the aforementioned observations, the structure of the protective film will be described in detail in line with the formation process. When using a protective film formation agent comprising benzotriazole, oleic acid, an organic solvent and water, the solvent components first evaporate, and the oleic acid insoluble in water is separated from the water. Subsequently, the oleic acid directs its hydrophilic group toward the nickel side (inside) and its alkyl group (including alkane) having a water repellent property toward the non-nickel side (outside) to form on the nickel coat surface arrayed crystals rising aslant in a mesh shape. The aqueous solution containing benzotriazole is repelled by the arrayed crystals of the oleic acid to enter between the arrays of the oleic acid crystals. The benzotriazole in the aqueous solution has its hydrophilic group positioned along the hydrophilic group of the oleic acid on the nickel side (inside) and its benzene ring that is the water repellent portion thereof positioned along the alkyl group that is the water repellent portion of the oleic acid on the outside. That is to say, the benzotriazole is filled in the surrounded cells between the arrays of the oleic acid crystals in a rising state in parallel to the oleic acid and, when the water has evaporated, is condensed in the cells to dispose the water repellent portions of the oleic acid and benzotriazole side by side on the outer surface of the protective film.

A protective film composed of benzotriazole has a structure in which the benzotriazole that is the plane molecule is merely stacked on the nickel coat surface in parallel and readily exfoliates. In a protective film composed of a combination of benzotriazole with an organic acid in the present invention, however, since the benzotriazole is condensed in a state of rising from the coat surface, as described above, the protective film per se is very tough. Of the protective film formation agents shown in Table 15 and having passed the DMG test under the EN 12471 standard, those containing triethanol as a solvent have revealed the best CASS test results and are thus preferred further because it is conceivable that the organic acid (oleic acid) makes the crystal arrays (lattices) dense.

By applying a protective film formation agent having an organic solvent dissolved therein according to the present invention to personal ornaments, such as finger rings, necklaces, pierced earrings, earrings, watches (their straps), eyeglasses (their frames), etc. playthings, such as mini cars, dolls, etc., stationery, such as pencil boxes, clips, etc., medical appliances, such as surgical knives, hype-sticks, etc. welfare and care equipment, such as invalid chairs, axilla clutches, etc., ornamental articles, food-processing equipment, medical products, etc. made of copper alloy, stainless steel, nickel alloy, steel, etc. plated with a material containing nickel, it is made possible to prevent an onset of a nickel allergy resulting from contact with these products and parts.

INDUSTRIAL APPLICABILITY

The nickel elution prevention method, protective film formation agent for prevention of nickel elution and detergent for prevention of nickel elution according to the present invention can be applied to water-contact instruments made of copper alloy including bronze and brass and to various kinds of products and parts made of stainless steel, nickel alloy, steel, etc. and can widely be provided in various fields as means for preventing nickel from being eluted with exactitude and lead from being eluted as well.

The invention claimed is:

1. A method for preventing elution of nickel from a water-contact instrument made of copper alloy and plated with a material containing nickel, which comprises applying a protective film formation agent which comprises a protective film formation component consisting essentially of a benzotriazole having a hydrophilic group and a straight-chain fatty acid, and an organic solvent for dissolving the component in water, to a surface of a nickel coat that wraps around and adheres to at least a water-contact surface of the water-contact instrument to form a protective film; and drying to intimately bond the protective film to the surface of the nickel coat; wherein the protective film consists essentially of the benzotriazole having a water-repellent outside and an inside having said hydrophilic group bonded intimately to the nickel coat and the straight-chain fatty acid having an inside having a hydrophilic group bonded intimately to the nickel coat, thereby suppressing elution of nickel with the protective film.

2. The method for preventing elution of nickel from a water-contact instrument made of copper alloy according to claim 1, further comprising forming a second protective film on a surface of said nickel coat at a water-contact section of the water-contact instrument using the protective film formation agent, thereby suppressing the elution of the nickel due to bimetallic corrosion via the second protective film.

3. The method for preventing elution of nickel from a water-contact instrument made of copper alloy according to claim 2, wherein the nickel coat has pinholes and a second protective film is formed in the pinholes using the protective film formation agent so that the copper alloy and nickel are insulated.

4. The method for preventing elution of nickel from a water-contact instrument made of copper alloy according to claim 1, wherein the protective film formation agent is used to form the protective film on a surface of a nickel coat on a water-contact section of the water-contact instrument, thereby suppressing via the protective film dissolution of the nickel by wetting.

5. The method for preventing elution of nickel from a water-contact instrument made of copper alloy according to claim 1, further comprising removing by rinsing a nickel salt adhering as a residual to an inside of the water-contact instrument and applying the protective film formation agent to at least the water-contact surface of the water-contact instrument to form a protective film.

6. The method for preventing elution of nickel from a wetted instrument made of copper alloy according to claim 5 and including lead, further comprising deleading a surface layer of the wetted section of the wetted instrument.

7. The method for preventing elution of nickel from a water-contact instrument made of copper alloy according to claim 6, wherein both the nickel salt adhering as the residual to the inside of the water-contact instrument and lead segregated on a surface layer of a water-contact section of the water-contact instrument are rinsed with a cleaning fluid containing a nitric acid and having a hydrochloric acid added thereto as an inhibitor.

* * * * *